United States Patent
Wald et al.

(10) Patent No.: US 8,229,790 B2
(45) Date of Patent: Jul. 24, 2012

(54) SYSTEM FOR MULTIMEDIA VIEWING BASED ON ENTITLEMENTS

(75) Inventors: Stephanie Wald, Givat Zeev (IL); Yossi Tsuria, Jerusalem (IL); David Richardson, Ramat Hasharon (IL); Eliphaz Hibshoosh, Tel Aviv (IL); Joseph Deutsch, Tel Aviv (IL); Shabtai Atlow, Efrat (IL)

(73) Assignee: NDS Limited, Staines, Middlesex (GB)

( * ) Notice: Subject to any disclaimer, the term of this patent is extended or adjusted under 35 U.S.C. 154(b) by 0 days.

(21) Appl. No.: 12/468,972

(22) Filed: May 20, 2009

(65) Prior Publication Data
US 2009/0234743 A1 Sep. 17, 2009

Related U.S. Application Data

(62) Division of application No. 10/522,069, filed as application No. PCT/IL03/00737 on Sep. 7, 2003.

(60) Provisional application No. 60/411,653, filed on Sep. 18, 2002, provisional application No. 60/441,943, filed on Jan. 23, 2003.

(51) Int. Cl.
*G06Q 30/00* (2012.01)

(52) U.S. Cl. ........... 705/14.64; 705/14.4; 705/14.7; 705/14.49; 705/52; 705/54; 725/22; 725/23; 725/24; 725/25; 713/155; 713/174; 709/203

(58) Field of Classification Search ........... 705/14.64, 705/14.4, 14.47, 14, 49, 52, 54; 725/22–26; 713/155–174
See application file for complete search history.

(56) References Cited

U.S. PATENT DOCUMENTS

| 5,555,376 | A | | 9/1996 | Theimer et al. |
| 5,708,478 | A | | 1/1998 | Tognazzini |
| 5,740,369 | A | * | 4/1998 | Yokozawa et al. ........... 709/217 |
| 5,804,803 | A | | 9/1998 | Cragun et al. |
| 5,806,005 | A | | 9/1998 | Hull et al. |
| 5,848,158 | A | | 12/1998 | Saito et al. |
| 5,864,125 | A | | 1/1999 | Szabó |
| 5,923,016 | A | | 7/1999 | Fredregill et al. |
| 5,971,277 | A | | 10/1999 | Cragun et al. |
| 5,979,757 | A | | 11/1999 | Tracy et al. |
| 6,169,498 | B1 | | 1/2001 | King et al. |
| 6,199,753 | B1 | | 3/2001 | Tracy et al. |
| 6,205,396 | B1 | | 3/2001 | Teicher et al. |

(Continued)

FOREIGN PATENT DOCUMENTS

EP 001204054 5/2002

(Continued)

OTHER PUBLICATIONS

Office Action Dated Oct. 19, 2009 in U.S. Appl. No. 10/522,069.

(Continued)

*Primary Examiner* — Khanh H Le
(74) *Attorney, Agent, or Firm* — Ladas & Parry LLP

(57) ABSTRACT

An advertising control method is described. The method includes receiving an advertisement identification message (AIM) (127) at a first mobile device (125), sending the AIM from the first mobile device to a content display unit (CDU) and storing the AIM in the CDU, selecting at least one content item from among a plurality of content items based, at least in part, on at least one stored AIM, the stored AIM being stored in the CDU, and displaying the selected content item on the CDU. Related apparatus and methods are also described.

4 Claims, 16 Drawing Sheets

U.S. PATENT DOCUMENTS

| | | | |
|---|---|---|---|
| 6,332,127 B1 | 12/2001 | Bandera et al. | |
| 6,401,032 B1 | 6/2002 | Jamison et al. | |
| 6,421,731 B1 | 7/2002 | Ciotti et al. | |
| 6,448,979 B1 | 9/2002 | Schena et al. | |
| 6,456,234 B1 | 9/2002 | Johnson | |
| 6,463,155 B1 | 10/2002 | Akiyama et al. | |
| 6,473,781 B1 | 10/2002 | Skagerwall et al. | |
| 6,484,148 B1 | 11/2002 | Boyd | |
| 6,490,432 B1 | 12/2002 | Wegener et al. | |
| 6,491,217 B2 | 12/2002 | Catan | |
| 6,496,776 B1 | 12/2002 | Blumberg et al. | |
| 6,681,393 B1 | 1/2004 | Bauminger et al. | |
| 6,741,864 B2 | 5/2004 | Wilcock et al. | |
| 6,782,253 B1 | 8/2004 | Shteyn et al. | |
| 6,848,148 B2 | 2/2005 | Braid et al. | |
| 6,879,600 B1* | 4/2005 | Jones et al. | 370/466 |
| 6,889,207 B2* | 5/2005 | Slemmer et al. | 705/54 |
| 6,914,626 B2 | 7/2005 | Squibbs | |
| 6,965,868 B1 | 11/2005 | Bednarek | |
| 6,968,181 B2 | 11/2005 | Ishidoshiro | |
| 6,983,371 B1 | 1/2006 | Hurtado et al. | |
| 7,013,286 B1 | 3/2006 | Aggarwal et al. | |
| 7,042,864 B1 | 5/2006 | Leung et al. | |
| 7,136,871 B2 | 11/2006 | Ozer et al. | |
| 7,174,130 B2 | 2/2007 | Kurisko et al. | |
| 7,236,475 B2 | 6/2007 | Watanabe et al. | |
| 7,254,614 B2 | 8/2007 | Mulligan et al. | |
| 7,366,468 B2 | 4/2008 | Yoshida | |
| 7,373,508 B1* | 5/2008 | Meier et al. | 713/168 |
| 7,512,987 B2 | 3/2009 | Williams | |
| 7,515,136 B1 | 4/2009 | Kanevsky et al. | |
| 7,805,613 B2* | 9/2010 | Apfelbaum | 713/185 |
| 2001/0054003 A1 | 12/2001 | Chien et al. | |
| 2002/0002034 A1 | 1/2002 | Davies et al. | |
| 2002/0004387 A1 | 1/2002 | Newville | |
| 2002/0008626 A1 | 1/2002 | Waters et al. | |
| 2002/0013144 A1 | 1/2002 | Waters et al. | |
| 2002/0032906 A1 | 3/2002 | Grossman | |
| 2002/0035545 A1 | 3/2002 | Ota et al. | |
| 2002/0077905 A1 | 6/2002 | Arndt et al. | |
| 2002/0083445 A1 | 6/2002 | Flickinger et al. | |
| 2002/0102993 A1 | 8/2002 | Hendrey et al. | |
| 2002/0107806 A1* | 8/2002 | Higashi et al. | 705/51 |
| 2002/0111154 A1 | 8/2002 | Eldering et al. | |
| 2002/0133817 A1 | 9/2002 | Markel | |
| 2002/0138433 A1 | 9/2002 | Black et al. | |
| 2002/0138831 A1 | 9/2002 | Wachtfogel et al. | |
| 2002/0139839 A1 | 10/2002 | Catan | |
| 2002/0139859 A1 | 10/2002 | Catan | |
| 2002/0143860 A1 | 10/2002 | Catan | |
| 2002/0147642 A1 | 10/2002 | Avallone et al. | |
| 2002/0152117 A1 | 10/2002 | Cristofalo et al. | |
| 2002/0156677 A1 | 10/2002 | Peters et al. | |
| 2002/0156861 A1 | 10/2002 | Pierce | |
| 2002/0160758 A1 | 10/2002 | Pradhan et al. | |
| 2002/0160759 A1 | 10/2002 | Pradhan et al. | |
| 2002/0160762 A1 | 10/2002 | Nave et al. | |
| 2002/0160793 A1 | 10/2002 | Pradhan et al. | |
| 2002/0161633 A1 | 10/2002 | Jacob et al. | |
| 2002/0164977 A1 | 11/2002 | Link, II et al. | |
| 2002/0164999 A1 | 11/2002 | Johnson | |
| 2002/0166119 A1 | 11/2002 | Cristofalo | |
| 2002/0166120 A1 | 11/2002 | Boylan, III et al. | |
| 2002/0166127 A1 | 11/2002 | Hamano et al. | |
| 2003/0018491 A1 | 1/2003 | Nakahara et al. | |
| 2003/0032474 A1 | 2/2003 | Kaminkow | |
| 2003/0065805 A1 | 4/2003 | Barnes, Jr. | |
| 2003/0120541 A1* | 6/2003 | Siann et al. | 705/14 |
| 2003/0139180 A1 | 7/2003 | McIntosh et al. | |
| 2003/0231854 A1 | 12/2003 | Derrenberger | |
| 2003/0236704 A1 | 12/2003 | Antonucci | |
| 2004/0078427 A1* | 4/2004 | Gil et al. | 709/203 |
| 2004/0143500 A1 | 7/2004 | Lopez et al. | |
| 2005/0004875 A1 | 1/2005 | Kontio et al. | |
| 2009/0236704 A1 | 9/2009 | Camacho et al. | |

FOREIGN PATENT DOCUMENTS

| | | |
|---|---|---|
| GB | 2 326 004 | 12/1998 |
| WO | 01/52451 | 7/2001 |
| WO | 02/46994 | 6/2002 |
| WO | 02/46994 A1 | 6/2002 |

OTHER PUBLICATIONS

Dierks, T. and C. Allen. "The TLS Protocol Version 1.0"., *Network Working Group, Request for Comments: 2246*, The Internet Society,1999, www.ietf.org/rfc/rfc2246.txt, pp. 1-71.

Wills, Tom. "The Identity of Electronic Devices", Digital Identity World, www.digitalidworld.com/print.php?sid=96.

Stajano, Frank. *Security for Ubiquitous Computing*. West Sussex, England: John Wiley & Sons, Ltd, 2002, pp. 88-105.

Kessler, Michelle. "Several consumer products to get 'tagged'", USAToday.com, Jan. 27, 2003, pp. 1-2.

Larcombe, Tim. "TV 2.0: Get Better Connected. Marketing in a television industry transformed by digital technology", Agency.com, Ltd., 2002.

Braodbent, Jonathan and Patrizia Marti. "Location aware mobile interactive guides: usability issues", pp. 1-15.

Brown, Eric S. "Wireless Gets Up Close", *Technology Review*, www.technologyreview.com, Sep. 14, 2004, pp. 1-3.

Gilbert, Alorie. "MIT to uncork futuristic bar code", www.msnbc.com, Aug. 29, 2003, pp. 1-5.

"Sunglasses to Track Body Temperature?", www.story.news.yahoo.com, Aug. 26, 2003, pp. 1-2.

Radio Frequency Identification (RFID) Home Page. Www.aimglobal.cog/technologies/rfid/.

Bennett, Graeme. "Personal Video Recorders. ReplayTV and TiVo, watch out: here comes the PC", Video Buyer's Guide.com, http://thtechnozone.com/videobuyersguide/, Jan. 9, 2001, pp. 1-5.

Delio, Michelle. "TV Commercials Get Personal", Wired News, www.wired.com, Sep. 20, 2000.

Thomas, Peter. "Feature: Information Appliances herald the New Usability", www.usabilitynews.com, Copyright 2001-2003, British HCI Group, pp. 1-4.

Emling, Shelley. "Billboards Move into the Digital Age", Coolsign Systems, www.coolsign.com. Mar. 3, 2003.

Richtel, Matt. "New Billboards Sample Radios as Cars Go By, Then Adjust", The New York Times, www.nytimes.com/2002/12/27/business/media/27ADCO.html, Dec. 27, 2002.

Martell, Lindsay. "Drive-by Advertising: New Electronic Billboards Tailor Advertising to Passing Motorists", ABCNEWS.com, www.abcnews.go.com, Dec. 27, 2002.

Woodruff, Allison et al. "Electronic Guidebooks and Visitor Attention", pp. 437-454, *International Cultural Heritage Informatics Meeting*, vol. 1. David Bearman and France Garzotto, editors. Copyright Politecnico di Milano and Archives Et Museum Informatics, 2001.

"Video Magic" from *New Scientist Magazine* (2000) at www.newscientist.com/article.ns?id=mg16822592.600&print=true.

"Sonopress—Content to Market" Internet home page of company (2004) at www.sonopress.com.

"Bringing Your Content to Market" company description (2005) at www.sonopress.com/us.

"The Revolution at the POS—Media Browser Network: State of the Art Technology with Self-Scanning" product description for Sonopress Media Browser Network (2005) at www.mediabrowser.info/scantechnik.php?SessionID=1412132a6e507c514a0b90d10e59975b.

"The Revolution at the POS—Media Browser Network: Logistics in the Online Age" Product description (2005) at www.mediabrowser.info/scantechnik.php?SessionID=1412132a6e507c514a0b90d10e59975b.

English abstract of KR 2001-99449.

Office Action issued in co-pending U.S. Appl. No. 12/469,100 on Dec. 12, 2001.

Office Action issued in U.S. Appl. No. 10/522,069 on Feb. 3, 2011.

Notice of Reexamination issued by the Chinese Patent Office on Jan. 27, 2011 in connection with a corresponding Chinese application.

Summons to an Oral Hearing issued by the European Patent Office on Feb. 25, 2011 in connection with a corresponding EPO application.
English Abstract of Korean Patent Application No. 2001-0067024.
Korean Action Mailed for Korean Patent Application 10-2010-7019506.
Korean Action Mailed for Korean Patent Application 10-2010-7019505.
Examination Report from AU Application No. 2003259538 dated Aug. 14, 2009.
Examination Report from the Australian Patent Office dated Jun. 15, 2011 in respect of corresponding Australian Patent Appln. 2010201250.
Examination Report in EPO Application No. 10 016 187.6-1238 Issued on Mar. 6, 2012.
R. Fielding et al; Hypertext Transfer Protocol—Http/1.1; Jun. 1999; pp. 1-176.

* cited by examiner

FIG. 3

| USER | □ | * | ⬠ | ⬡ |
|---|---|---|---|---|
| PHILIP | 5 | 1 | 0 | 2 |
| DINA | 2 | 7 | 1 | 1 |

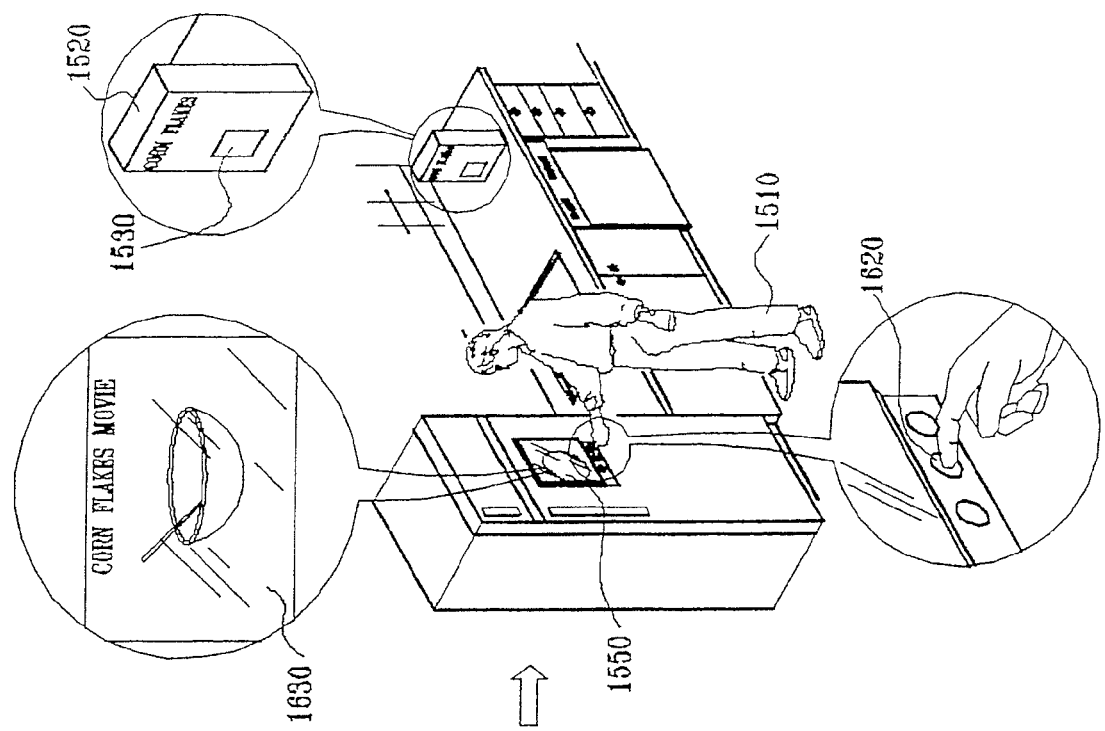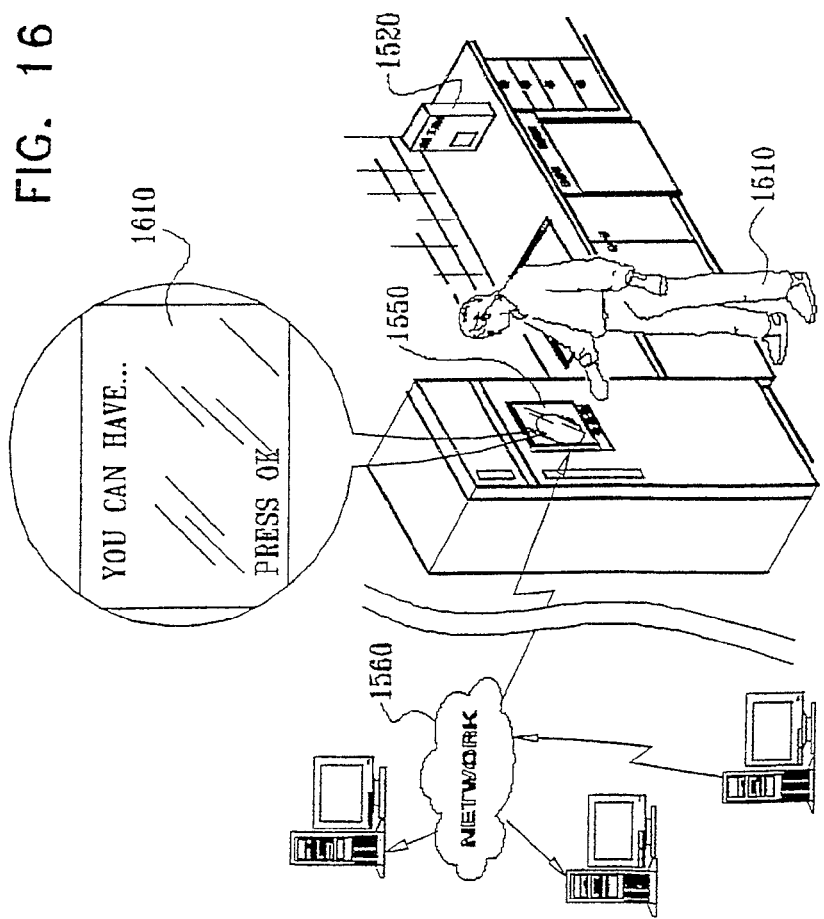
FIG. 16

SYSTEM FOR MULTIMEDIA VIEWING BASED ON ENTITLEMENTS

CROSS-REFERENCE TO RELATED APPLICATIONS

The present application is a divisional application of U.S. application Ser. No. 10/522,069, which is a National Phase filing of PCT/IL03/00737, filed on 7 Sep. 2003, published in the English language as WO 2004/027538 on 1 Apr. 2004, which claims priority from U.S. Provisional Patent Application 60/411,653 filed 18 Sep. 2002, and from U.S. Provisional Patent Application 60/441,943 filed 23 Jan. 2003, the disclosures of which are hereby incorporated herein by reference.

FIELD OF THE INVENTION

The present invention relates to delivery of digital content, and more particularly to systems for controlling the delivery of digital content.

BACKGROUND OF THE INVENTION

PCT Published Patent Application WO 01/52541 of NDS Limited describes a system for providing advertisements in an end-user controlled playback environment.

Digital IDs are well known in the art—see for instance abstract of presentation, *Identity of Electronic Devices*, Tom Willis, available oil the World Wide Web at www.digitalidworld.com/print.php?sid=96.

Ubiquitous computing is well known in the art. Ubiquitous computing is a movement to turn away from direct interaction with computers in day-to-day life, and instead to interact with everyday appliances and devices. Everyday appliances and devices retain their narrow range of function, but have now been endowed with computing power to deal with information based tasks. See for example: Frank Stajano, *Security for Ubiquitous Computing*, John Wiley & Sons, 2002, especially pp. 88-105.

Bluetooth, WiFi, infrared and other wireless communication methods are well known in the art and are commercially available.

Transport Layer Security ("TLS", a standardized version of the SSL protocol used on the Internet for secure communications), is described in RFC2246, The TLS Protocol, Version 1.0, and may be found on the World Wide Web at www.ietf.org/rfc/rfc2246.txt.

Advertising is a widespread model for businesses to provide information about products to people. The value to the advertiser comes from the products purchased and payment for the advertisements is typically on the basis of the number of viewers. The advertiser therefore wants to target advertisements at viewers who have demonstrated that they are more likely to be interested in the products, thereby converting the minimum number of viewers paid for to the maximum number of products purchased. This, for instance, is what lead to the development of the "soap opera"—programming whose content was deliberately designed to appeal to the potential customers for detergent soaps.

Many products have addressed methods of improving advertisement targeting by profiling the potential audience, both in public multi-media displays and in the context of Personal Video Recorders (PVRs). In public locations, the methods typically assume that a user has specified a profile which is carried around on a mobile devices such as a Personal Digital Assistant (PDA) or mobile phone and an advertisement display system collects the profiles of those in the area in order to decide which advertisement to display. In the PVR context, the methods are an extension of the conventional TV model, in which the advertisements displayed are a function of the content viewed.

TiVo now offers TiVo direct, an interactive program that allows advertising content to be delivered to users via their TiVo device. TiVo direct is described in an article found on the Internet at: www.wired.com/news/print/0,1294,38754,00.html.

A paper published in the *International Cultural Heritage Informatics Meeting*, Politecnico di Milano and Archives Et Museum Informatics, 2001, vol. 1, pps. 437-454 describes an electronic guidebook prototype, and reports on a study of the use of the electronic guidebook in a historic house.

A system of electronic billboards tailoring advertising to passing motorists based on the radio station the motorists are listening to while driving by the billboard is described on the World Wide Web at abcnews.go.com/sections/business/TechTV/techtv_advertising_021227.html and in a New York Times article available at www.nytimes.com/2002/1227/business/media/27ADCO.html and in public relations material at the web site of a company offering such a service, at: www.coolsign.com/company/pr_0020903.htm.

Radio frequency identification (RFID) first appeared in tracking and access applications during the 1980s. These wireless automatic identification and data collection systems allow for non-contact reading and are effective in manufacturing and other hostile environments where bar code labels could not survive. RFID has established itself in a wide range of markets including livestock identification and automated vehicle identification (AVI) systems because of its ability to track moving objects. RFID technology is described in greater detail on the World Wide Web (WWW) at www.aimglobal.org/technologies/rfid.

A system of selling products with tiny computer chips containing data such as the serial number of the product is described on the World Wide Web at www.usatoday.com/tech/new/techinnovations/2003-01-27-rfid_x.htm. A scanner can read the chips and then send the data to a database so that stores and manufacturers can quickly track what is sold.

UK Patent 2326004, and corresponding U.S. patent application Ser. No. 09/089,717 of Bauminger et al, describe a viewer response method for use with an interactive telecommunications system, the method comprising accumulating a user interaction history of a user of the system, the user interaction history comprising user interaction information associated with a plurality of user interaction events; and providing user-sensible feedback, based at least in part on the user interaction history, wherein the interactive telecommunications system comprises a television system, and the user interaction history comprises a viewing history comprising viewing information associated with a plurality of viewing events, said plurality of viewing events comprising the viewer viewing at least two distinct television broadcast items, and said at least two distinct television broadcast items comprise at least two distinct television broadcast items selected, according to at least one predetermined criterion, from a plurality of television broadcast items broadcast via the interactive telecommunications system.

In addition, the following U.S. patents and patent applications are believed to reflect the state of the art:
U.S. Pat. No. 6,456,234 to Johnson;
U.S. Pat. No. 5,708,478 to Tognazzini;
U.S. Pat. No. 6,199,753 to Tracy et al;
U.S. Pat. No. 6,496,776 to Blumberg et al;
U.S. Pat. No. 5,979,757 to Tracy et al;
U.S. Pat. No. 6,448,979 to Schena et al;

U.S. Pat. No. 6,401,032 to Jamison et al;
U.S. Pat. No. 5,864,125 to Szabó;
U.S. Pat. No. 5,804,803 to Cragun et al;
U.S. Pat. No. 6,473,781 to Skagerwall et al;
U.S. Pat. No. 5,971,277 to Cragun et al;
U.S. Pat. No. 6,205,396 to Teicher et at;
U.S. Pat. No. 6,169,498 to King et al;
U.S. Pat. No. 5,740,369 to Yokazawa et al;
U.S. Pat. No. 6,490,432 to Wegener et al;
2002/0139839 of Catan;
2002/0139859 of Catan;
2002/0143860 of Catan;
2002/0133817 of Markel;
2002/0013144 of Waters et al;
2002/0008626 of Waters et al;
2002/0156677 of Peters et al;
2002/0138433 of Black et al;
2002/0111154 of Eldering et al;
2002/0160758 of Pradhan et al;
2002/0160759 of Pradhan et al;
2002/0160793 of Pradhan et al;
2002/0152117 of Cristofalo et al;
2002/0147642 of Avallone et al;
2002/0077905 of Arndt et al;
2002/0161633 of Jacob et al;
2002/0164999 of Johnson;
2002/0164977 of Link et al;
2002/0166119 of Cristofalo;
2002/0166127 of Hamano et al;
2002/0083445 of Flickinger et al;
2002/0102993 of Hendry at al;
2002/0160762 of Nave et al; and
2002/0166120 of Boylan et al.

The disclosures of all references mentioned above and throughout the present specification, as well as the disclosures of all references mentioned in those references, are hereby incorporated herein by reference.

SUMMARY OF THE INVENTION

The present invention seeks to provide an improved method of delivering digital content.

The present invention, in preferred embodiments thereof, provides a method for a person using a personal device, such as a PDA or mobile phone, to collect advertisement-viewing "points" in a passive manner, and for an advertisement displaying mechanism to "spend" those points to select the most appropriate advertisements. The present invention, in preferred embodiments thereof, establishes a relationship between actions that grant points and those that provide the advertising service and deduct points. For example, and without limiting the generality of the foregoing, points might be granted with the purchase of particular objects, or when inquiries about services are made. The relationship preferably includes controlling the amount of points granted, categorization of points such that points of one category are used to view advertisements of specific products corresponding to that category, and logging and/or charging of the advertisements that were viewed against the points that were collected.

In certain preferred embodiments, the present invention is especially but not uniquely adapted for use at home. The home differs from public locations because it is possible to associate individuals with their home and to specify special behavior related to the home environment such as the transfer of points accumulated to the home system, for determination of which advertisements to playout when no personal device is present. It is also possible to define a "guest", someone who is not permanently associated with the home but who is currently present in the home. Furthermore, advertisement display behavior may be adjusted based both on: points of home residents present or whose points have been transferred; and on points of guests present. In certain preferred embodiments of the present invention, points of guests may be treated differently from points of home residents.

In an alternative preferred embodiment of the present invention, an article sold to a consumer comprises an embedded entitlement. The entitlement may be active from the time of embedding. Alternatively, the entitlement may be made active at a later time, such as, for example, when the article is purchased. At a given time, either automatically or with the explicit input from the consumer, the entitlement is used to provide the consumer with content.

There is thus provided in accordance with a preferred embodiment of the present invention an advertising control method receiving an advertisement identification message (AIM) at a first mobile device, sending the AIM from the first mobile device to a content display unit (CDT) and storing the AIM in the CDU, selecting at least one content item from among a plurality of content items based, at least in part, on at least one stored AIM, the stored AIM being stored in the CDU, and displaying the selected content item on the CDU.

Further in accordance with a preferred embodiment of the present invention the sending the AIM from the first mobile device to the CDU includes secure sending.

Still further in accordance with a preferred embodiment of the present invention the content item includes an advertisement.

Additionally in accordance with a preferred embodiment of the present invention the content item includes at least one of the following: music; a music video; an interactive game; and video content.

Moreover in accordance with a preferred embodiment of the present invention the advertising control method also includes after the displaying, marking the at least one AIM stored on the CDU as used.

Further in accordance with a preferred embodiment of the present invention the advertising control method also includes after the displaying, deleting the at least one stored AIM from the CDU.

Still further in accordance with a preferred embodiment of the present invention the advertising control method also includes deleting the at least one AIM from the first mobile device.

Additionally in accordance with a preferred embodiment of the present invention the advertising control method also includes registering the first mobile device on the CDU.

Moreover in accordance with a preferred embodiment of the present invention the selecting is also based, at least in part, on at least one AIM received at the CDU from a second mobile device, the second mobile device not being registered on the CDU.

Further in accordance with a preferred embodiment of the present invention the selecting is performed without regard to at least one AIM associated with a second mobile device, the second mobile device not being registered on the CDU.

Still further in accordance with a preferred embodiment of the present invention the advertising control method also includes sending at least one AIM from the first mobile device registered on the CDU when the mobile device is in the proximity of the CDU.

Additionally in accordance with a preferred embodiment of the present invention the sending the at least one AIM from the first mobile device registered on the CDU includes secure sending.

Moreover in accordance with a preferred embodiment of the present invention the advertising control method also includes querying a user of the mobile device to authorize sending at least one AIM from the first mobile device to the CDU, and performing the sending only upon receipt of a positive answer to the querying.

Further in accordance with a preferred embodiment of the present invention the sending performed upon receipt of a positive answer to the querying includes secure sending.

Still further in accordance with a preferred embodiment of the present invention the advertising control method also includes registering the first mobile device on a plurality of CDUs.

Additionally in accordance with a preferred embodiment of the present invention the registering includes using a public key authentication scheme.

Moreover in accordance with a preferred embodiment of the present invention the advertising control method also includes entering personal user information during the registering.

Further in accordance with a preferred embodiment of the present invention the advertising control method also includes encrypting the personal user information.

Still further in accordance with a preferred embodiment of the present invention the advertising control method also includes after the receiving, performing a security check on the AIM.

Additionally in accordance with a preferred embodiment of the present invention the security check includes verifying a digital signature.

Moreover in accordance with a preferred embodiment of the present invention the advertising control method also includes unregistering the first mobile device on the CDU.

Further in accordance with a preferred embodiment of the present invention the advertising control method also includes unregistering the first mobile device on at least one of the plurality of CDUs.

Still further in accordance with a preferred embodiment of the present invention the registering includes secure unregistering utilizing a public key authentication scheme.

There is also provided in accordance with another preferred embodiment of the present invention a content control method including associating an entitlement with a content item identifier, embedding the entitlement in an article, sending the entitlement from the article to a content display unit (CDU), and displaying a content item associated with the content item identifier on the CDU.

Further in accordance with a preferred embodiment of the present invention the sending the entitlement from the article includes secure sending.

Still further in accordance with a preferred embodiment of the present invention the displaying includes locating the content item to be displayed based, at least in part, on location information included in the content item identifier.

Additionally in accordance with a preferred embodiment of the present invention the locating includes locating the content item to be displayed via remote network access.

Moreover in accordance with a preferred embodiment of the present invention the remote network access includes World Wide Web (WWW) access.

Further in accordance with a preferred embodiment of the present invention the entitlement includes content item network location information for determining a location of the content item on the remote network.

Still further in accordance with a preferred embodiment of the present invention the sending includes sending the entitlement to the CDU using a wireless communication protocol.

Additionally in accordance with a preferred embodiment of the present invention the sending includes sending the entitlement to the CDU using a wired communication protocol.

Further in accordance with a preferred embodiment of the present invention the sending includes sending the entitlement to the CDU upon receipt of an instruction from a user.

Still further in accordance with a preferred embodiment of the present invention the sending includes querying the user to authorize transfer of the entitlement to the CDU, and sending the entitlement to the CDU only if the user authorizes the transfer.

Additionally in accordance with a preferred embodiment of the present invention the sending from the article also includes verifying that the CDU is able to display the content item associated with the entitlement, and performing the sending only upon receipt of a positive answer to the verifying.

Moreover in accordance with a preferred embodiment of the present invention the sending includes verifying that the CDU is able to display the content item associated with the entitlement, based on result of the verifying, querying the user to authorize transfer of the entitlement to the CDU, and performing the sending only upon receipt of a positive answer to the querying.

Further in accordance with a preferred embodiment of the present invention the verifying includes the article polling the CDU.

Still further in accordance with a preferred embodiment of the present invention the verifying includes the CDU polling the article.

Additionally in accordance with a preferred embodiment of the present invention the entitlement includes a disabled entitlement.

Moreover in accordance with a preferred embodiment of the present invention the content control method also includes sending an enabling message to the article, thereby enabling the disabled entitlement.

Further in accordance with a preferred embodiment of the present invention the sending an enabling message to the article includes secure sending.

Still further in accordance with a preferred embodiment of the present invention the sending an enabling message is performed after an enabling action is performed.

Additionally in accordance with a preferred embodiment of the present invention the enabling action includes sending a securely signed message.

Moreover in accordance with a preferred embodiment of the present invention the message is sent using a wireless communication protocol.

Further in accordance with a preferred embodiment of the present invention the message is sent using a wired communication protocol.

Still further in accordance with a preferred embodiment of the present invention the entitlement includes an inactive entitlement.

Additionally in accordance with a preferred embodiment of the present invention the content control method also includes activating the inactive entitlement.

Moreover in accordance with a preferred embodiment of the present invention the activating includes actuating and/or de-actuating an actuator.

Further in accordance with a preferred embodiment of the present invention the activating includes opening a container.

Still further in accordance with a preferred embodiment of the present invention the activating is triggered by heating a heat sensor.

Additionally in accordance with a preferred embodiment of the present invention the heating includes heating the heat sensor with body heat.

Moreover in accordance with a preferred embodiment of the present invention the content control method also includes de-activating the entitlement.

Further in accordance with a preferred embodiment of the present invention the content control method also includes disabling the entitlement after the sending to the CDU.

Still further in accordance with a preferred embodiment of the present invention the content control method also includes not disabling the entitlement after the sending to the CDU.

Additionally in accordance with a preferred embodiment of the present invention altering the entitlement after the sending to the CDU.

Moreover in accordance with a preferred embodiment of the present invention the entitlement includes an entitlement value, and the altering includes reducing the entitlement value.

Further in accordance with a preferred embodiment of the present invention the content item includes a series of content items, and the entitlement includes an entitlement to at least one member of the series of content items.

Still further in accordance with a preferred embodiment of the present invention the displaying includes displaying the content on the CDU exactly once.

Additionally in accordance with a preferred embodiment of the present invention the CDU includes a plurality of CDUs and the displaying includes displaying the content on one of the plurality of CDUs exactly once.

Moreover in accordance with a preferred embodiment of the present invention the content control method also includes displaying the content on the CDU only during a display time period.

Further in accordance with a preferred embodiment of the present invention the content control method also includes associating the displaying of the content on the CDU with a personal domain.

Still further in accordance with a preferred embodiment of the present invention the CDU includes at least one of the following: a domain identification name; a domain identification number; and a domain key.

Additionally in accordance with a preferred embodiment of the present invention the content control method also includes associating the entitlement with the personal domain at the time of the sending.

Moreover in accordance with a preferred embodiment of the present invention the content control method also includes aggregating of entitlements by a first user.

Further in accordance with a preferred embodiment of the present invention the content control method also includes trading of entitlements between the first user and a second user.

Still further in accordance with a preferred embodiment of the present invention the content control method also includes selling entitlements from the first user to the second user.

Additionally in accordance with a preferred embodiment of the present invention the content control method also includes loaning entitlements by the first user to the second user.

There is also provided in accordance with still another preferred embodiment of the present invention an object including an entitlement store storing an entitlement associated with a content item, and a communication unit operative to receive the entitlement from the entitlement store and send the entitlement to a display unit.

Further in accordance with a preferred embodiment of the present invention the communication unit is operative to securely send the entitlement to the display unit.

Still further in accordance with a preferred embodiment of the present invention the display unit is external to the object.

Additionally in accordance with a preferred embodiment of the present invention the object also includes a content display unit (CDU) operative to receive the entitlement, the CDU including the display unit.

Moreover in accordance with a preferred embodiment of the present invention the object also includes an entitlement enablement receiving unit.

There is also provided in accordance with another preferred embodiment of the present invention an advertisement identification message (AIM) distribution terminal including an AIM receiver operative to receive at least one AIM from an AIM distributing authority, an AIM storage unit for storing the at least one received AIM, and an AIM dispenser operative to dispense the at least one AIM to a mobile device operative to receive AIMs.

There is also provided in accordance with another preferred embodiment of the present invention a mobile device including an advertisement identification message (AIM) receiver for receiving at least one AIM from an AIM source external to the mobile device, an AIM storage unit for storing the at least one received AIM, and an AIM sender for sending the at least one stored AIM to a content display unit (CDU) external to the mobile device.

Further in accordance with a preferred embodiment of the present invention the AIM sender is operative to securely send the at least one stored AIM to the CDU.

Still further in accordance with a preferred embodiment of the present invention the at least one AIM includes a plurality of AIMs.

Additionally in accordance with a preferred embodiment of the present invention the AIM source external to the mobile device includes a plurality of AIM sources external to the mobile device.

There is also provided in accordance with another preferred embodiment of the present invention a content display unit (CDU) including an advertisement identification message (AIM) receiver for receiving at least one AIM from a mobile device, an AIM storage unit for storing the at least one received AIM, a content item selector for selecting at least one content item from among a plurality of content items based, at least in part, on at least one AIM stored in the AIM storage unit, and a display for displaying the selected content item.

Further in accordance with a preferred embodiment of the present invention the plurality of content items is delivered to the CDU in a plurality of data streams including content items.

Still further in accordance with a preferred embodiment of the present invention the plurality of content items is stored on storage media included in the CDU.

Additionally in accordance with a preferred embodiment of the present invention the CDU chooses content items for display based, at least in part, on received metadata.

Moreover in accordance with a preferred embodiment of the present invention the CDU periodically sends an AIM usage report to an AIM distributing authority.

Further in accordance with a preferred embodiment of the present invention the AIM usage report includes at least one of the following: at least one AIM received by the CDU; and at least one advertisement point used by the CDU.

Still further in accordance with a preferred embodiment of the present invention the CDU periodically reports content item usage to the AIM distributing authority.

Additionally in accordance with a preferred embodiment of the present invention the CDU is activated at the time of purchase.

There is also provided in accordance with another preferred embodiment of the present invention a content item selection method including accumulating content item display points for each of a plurality of display point categories, and choosing a content item for display based, at least in part, on a comparison between a point total for one of the display point categories and a category associated with the content item.

Further in accordance with a preferred embodiment of the present invention the accumulating includes receiving at least one advertisement identification message (AIM) including content item display points associated with a display point category, and storing the content item display points included in the AIM in accordance with the display point category.

Still further in accordance with a preferred embodiment of the present invention the receiving includes distinguishing between AIMs received from a sender who is registered and AIMs received from a sender who is not registered.

Additionally in accordance with a preferred embodiment of the present invention the receiving also includes ignoring the AIMs received from the sender who is not registered.

There is also provided in accordance with still another preferred embodiment a content identification message including a quantity of points redeemable for content, and metadata including a content category identifier identifying a category to which the content belongs, and at least one of the following: a distributing entity identifier identifying an entity which distributed the content identification message; a time stamp identifying a time when the content identification message was distributed, a basis for distribution identifier identifying a basis for distributing the content identification message; and a location-of-distribution identifier identifying the location of the entity which distributed the content identification message.

Further in accordance with a preferred embodiment of the present invention the content includes an advertisement.

Still further in accordance with a preferred embodiment of the present invention the content includes at least one of the following: music; a music video; an interactive game; and video content.

There is also provided in accordance with a preferred embodiment of the present invention an advertising control system including an advertisement identification message (AIM) receiver included in a first mobile device, the AIM receiver receiving an AIM, an AIM sender included in the first mobile device, the AIM sender sending the AIM to a content display unit (CDU), an AIM storage unit included in the CDU, the AIM storage unit being operative to store the AIM received from the first mobile device, a content item selector included in the CDU, the content item selector being operative to select at least one content item from among a plurality of content items based, at least in part, on at least one stored AIM, the stored AIM being stored in the CDU, and a display included in the CDU, the display being operative to display the selected content item.

There is also provided in accordance with another preferred embodiment of the present invention an apparatus for content control including an entitlement associating unit associating an entitlement with a content item identifier, an entitlement embedding unit embedding the entitlement in an article, an entitlement sender sending the entitlement from the article to a content display unit (CDU), and a display operative to display the content item associated with the content item identifier on the CDU.

There is also provided in accordance with still another preferred embodiment of the present invention a content distribution method including storing an entitlement associated with a content item in an entitlement store, receiving the entitlement from the entitlement store at a communication unit, and sending the entitlement from the communication unit to a display unit.

There is also provided in accordance with another preferred embodiment of the present invention an advertisement identification message (AIM) distribution method including receiving at least one AIM from an AIM distributing authority, storing the at least one received AIM, and dispensing the at least one AIM to a mobile device operative to receive AIMs.

There is also provided in accordance with still another preferred embodiment of the present invention an advertisement identification message (AIM) distribution method including receiving at least one AIM from an AIM source external to a mobile device, storing the at least one received AIM, and sending the at least one stored AIM to a content display unit (CDU) external to the mobile device.

There is also provided in accordance with another preferred embodiment of the present invention a content display method including receiving at least one advertisement identification message (AIM from a mobile device, storing the at least one received AIM, selecting at least one content item from among a plurality of content items based, at least in part, on at least one stored AIM, and displaying the selected content item.

There is also provided in accordance with still another preferred embodiment of the present invention an apparatus for content item selection including a store for accumulating content item display points for each of a plurality of display point categories, and a content item selection unit operative to choose a content item for display based, at least in part, on a comparison between a point total for one of the display point categories and a category associated with the content item.

BRIEF DESCRIPTION OF THE DRAWINGS

The present invention will be understood and appreciated more fully from the following detailed description, taken in conjunction with the drawings in which:

FIG. 3 is a simplified illustration of a table of advertisement points comprised in AIMs as stored in the memory of a Content Displaying Unit (CDU), useful for understanding the system of FIGS. 1 and 2;

FIGS. 15 and 16 are simplified pictorial illustrations of a content delivery system, constructed and operative in accordance with an alternative preferred embodiment of the present invention.

DETAILED DESCRIPTION OF A PREFERRED EMBODIMENT

Figure 1:
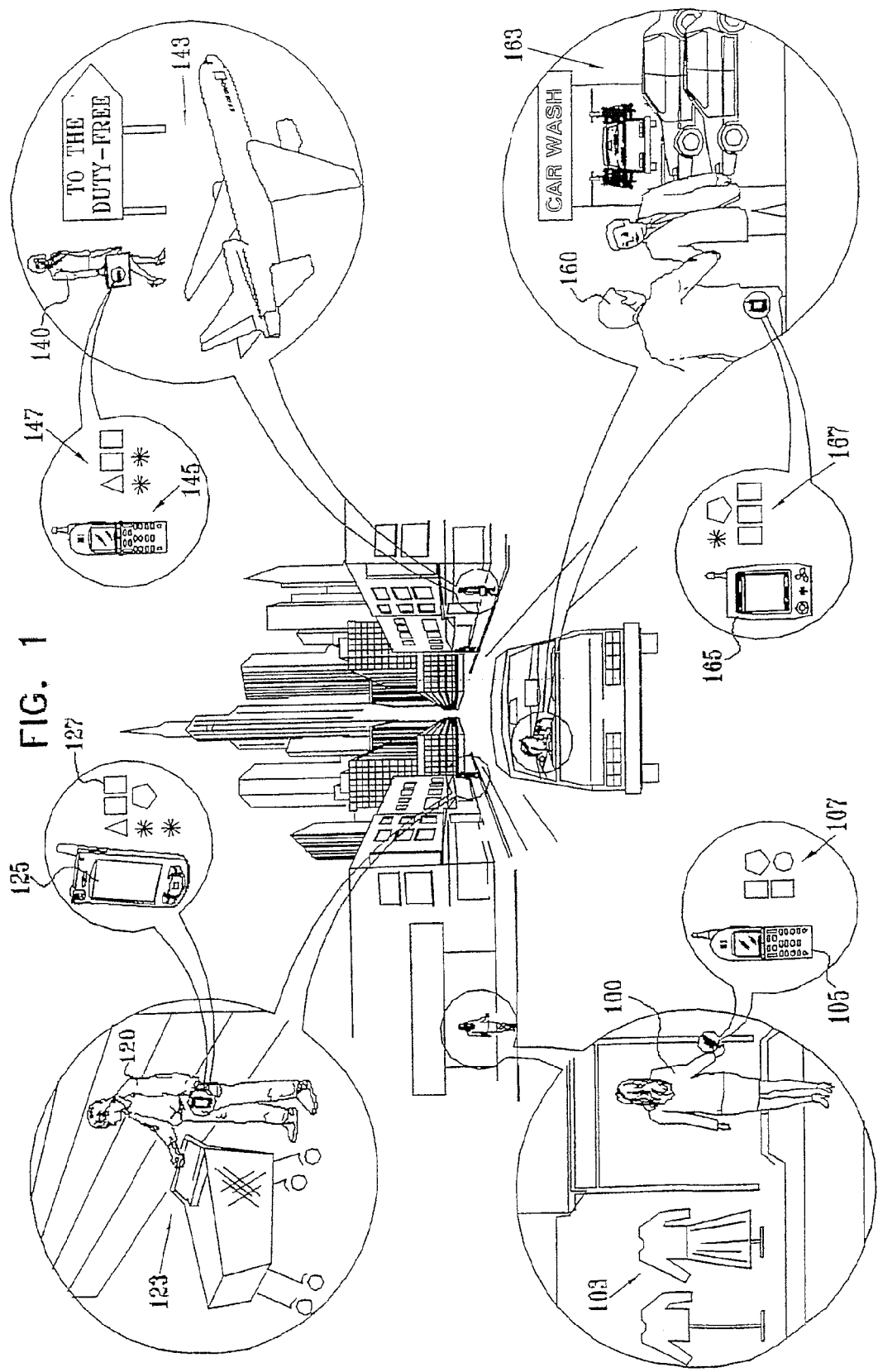
FIGS. 1 and 2 are simplified pictorial illustrations of an Advertisement Identification Message (AIM) distribution and usage system constructed and operative in accordance with a preferred embodiment of the present invention.
Figure 2:
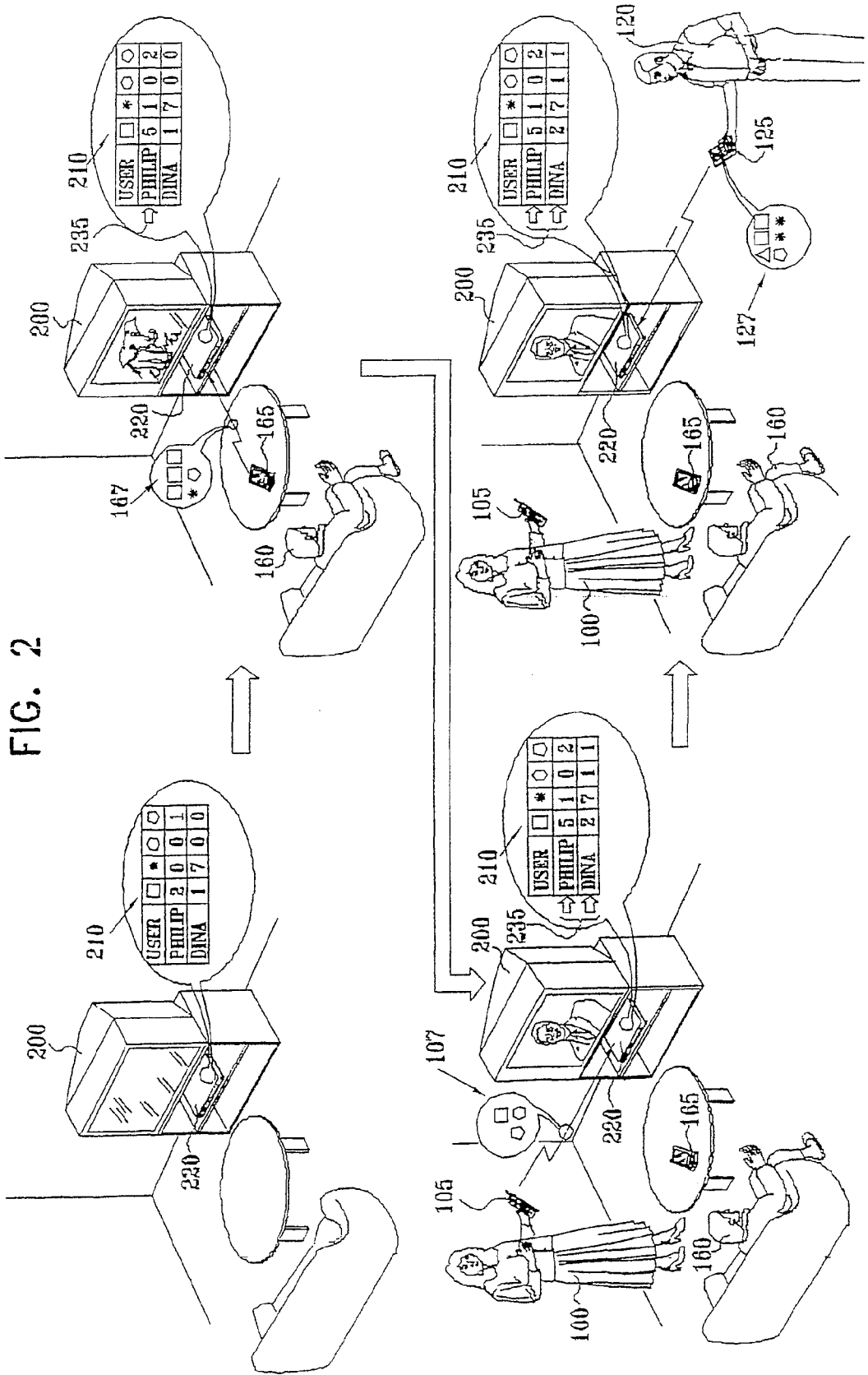

Reference is now made to FIGS. 1 and 2, which are simplified pictorial illustrations of an Advertisement Identification Message (AIM) distribution and usage system constructed and operative in accordance with a preferred embodiment of the present invention. In the system of FIGS. 1 and 2 content is delivered to consumers. Throughout the present specification and claims, the terms "content" and "advertisement" are used interchangeably. Without limiting the generality of the present invention, it is appreciated that many appropriate types of content, other than advertisements, may be delivered to consumers. Some non-limiting examples of such content include, for example: music and music videos; interactive games; and video content, such as short clips or cartoons.

More specifically, FIG. 1 is a pictorial illustration depicting people "out and about" in the world, acquiring AIMs on mobile devices. AIMs are analogous to currency in certain preferred embodiments of the present invention, and can be exchanged at a later time for viewing targeted advertisements. In addition, as explained below, in preferred embodiments of the present invention there are preferably a plurality of different types of AIMs. As will be explained in more detail below with reference to FIG. 10, the choice of advertisement displayed on a Content Displaying Unit (CDU) depends, at least in part, on the types of AIMs accrued.

FIG. 1 shows examples of typical situations in which a person would acquire at least one AIM. FIG. 2 is the continuation of the "story" illustrated in FIG. 1, and shows examples of typical situations in the home after the persons shown in FIG. 1 return home, having acquired the at least one AIM. It is appreciated that all of the situations illustrated in FIGS. 1 and 2 are examples only and are not meant to limit the generality of the present invention.

Referring specifically to FIG. 1, a woman 100 looks in the window of a clothing shop 103. The woman's mobile phone 105 acquires at least one AIM 107 from the shop 103. A preferred method of AIM acquisition is described in greater detail with reference to FIG. 7.

In FIG. 1, AIMs are symbolically represented as different shapes, in order to indicate different types of AIMs. For example, and without limiting the generality of the foregoing, different types of AIMs may be used for: different products; or for the same product sold by different stores or different chains of stores, as explained below with reference to FIGS. 12 and 14. For example, in the mobile phone 105, the AIMs 107 comprise: two rectangular AIMs; one pentagonal AIM; and one hexagonal AIM. In PDA 125 the AIMs 127 comprise: two star AIMs; one triangular AIM; two rectangular AIMs; and one pentagonal AIM. It is appreciated that the numbers and different types of AIMs in the mobile devices illustrated in FIG. 1 are given by way of example only, and are not meant to limit the generality of the present invention. It is further appreciated that a plurality of advertisement points may be comprised in a given AIM, as explained below with reference to FIG. 12. In the example illustrated in FIGS. 1 and 2, each AIM has the value of one advertisement point.

A man 120 shops for groceries while his PDA 125 acquires at least one AIM 127 from the store 123. A woman 140 at an airport 143 acquires at least one AIM 147 while carrying her mobile phone 145. A man 160 leaves a car wash 163, where his PDA 165 has acquired at least one AIM 167.

Reference is now made specifically to FIG. 2, which is a simplified pictorial illustration of people at home transferring at least one AIM to a CDU, showing both registered users and guests.

FIG. 2 shows some of the individuals depicted in FIG. 1 after they return home. In the first panel of FIG. 2, no people are yet in the room. A television 200 is in the room. A set-top box, PVR or other appropriate device, comprising a CDU 220, is operatively connected to the television 200 (connection not shown). The CDU 220 preferably stores in memory a table of AIMs 210. The table 210 preferably comprises a matrix of users and AIMs. In addition, a total number of AIMs of each type accrued is preferably computable by the CDU as needed.

In the second panel of FIG. 2, Philip 160 is sitting on a couch. Philip has placed his PDA 165 on the table in the room. As is known in the art of wireless protocols, the CDU 220 and the PDA 165 begin a process of polling until each device detects the other. For example, and without limiting the generality of the foregoing, typical wireless communication protocols include WiFi and Bluetooth. Once wireless communication is established, the PDA 165, using any appropriate wireless communication protocol, preferably transfers at least one accumulated AIM 167 to the CDU 220. All wireless communication described herein is preferably established between devices by a process of polling, as described above. For the sake of brevity, and as the polling process is not directly of interest to the present invention, further descriptions of wireless communication will omit the stage wherein communication is established.

It is appreciated that in some preferred embodiments wired communication may be used for transferring at least one accumulated AIM 167 to the CDU 220. It is further appreciated that wherever in the present specification wireless communication is mentioned, wired communication may alternatively be used, as is known in the art.

In an alternative preferred embodiment the CDU 220 presents a query to the Philip 160, requiring Philip 160 to explicitly authorize transfer of the at least one accumulated AIM 167 from the mobile device mobile device to the CDU 220. The at least one accumulated AIM 167 is preferably transferred to the CDU 220 only upon receipt to a positive answer to the querying.

The table of AIMs 210 in CDU memory is preferably updated to reflect the addition of the at least one AIM 167. Once the at least one AIM 167 is transferred, no AIMs remain in the PDA 165. As described above, AIMs are analogous to currency; specifically, once an AIM is transferred, it is as though the AIM has been "spent", and the AIM is no longer available in the PDA 165 for use.

Arrows such as those associated with reference numeral 235 are used in FIG. 2 to indicate that the CDU is "aware" that a registered user is present in the room. In the second panel of FIG. 2, an arrow 235 indicates that registered user Philip is present. It is appreciated that the CDU is "aware" of Philip's presence when the CDU and the Philip's PDA 165 detect one another through the polling process described above.

In the third panel of FIG. 2, Dina 100 is now present in the room Dina is holding her mobile phone 105. The mobile phone 105, using any appropriate wireless communication protocol, preferably transfers at least one accumulated AIM 107 to the CDU 220. The table of AIMs 210 in CDU memory is updated to reflect the addition of at least one AIM 107. Arrows 235 indicate that registered users Philip and Dina are present in the room. Once the at least one AIM 107 is transferred, no AIMs remain in the mobile phone 105.

In the fourth panel of FIG. 2, Tom 120, a guest, enters the room. Tom 120 is holding a PDA 125. The PDA 125, using any appropriate wireless communication protocol, attempts to transfer at least one accumulated AIM 127 to the CDU 220. Since Tom 120 is a guest, Tom is not listed as a registered user in the table of AIMs 210 in CDU memory. Although, as will be explained below, the AIMs on Tom's PDA 125 are preferably taken into account when determining which advertisement to display, the table of AIMs 250 is preferably not updated to reflect the addition of the at least one AIM 127. Because Tom is a guest, the at least one AIM on Tom's PDA 125 is preferably not transferred to the CDU 220, and the at least one AIM 127 remains in the PDA 125.

Figure 3:
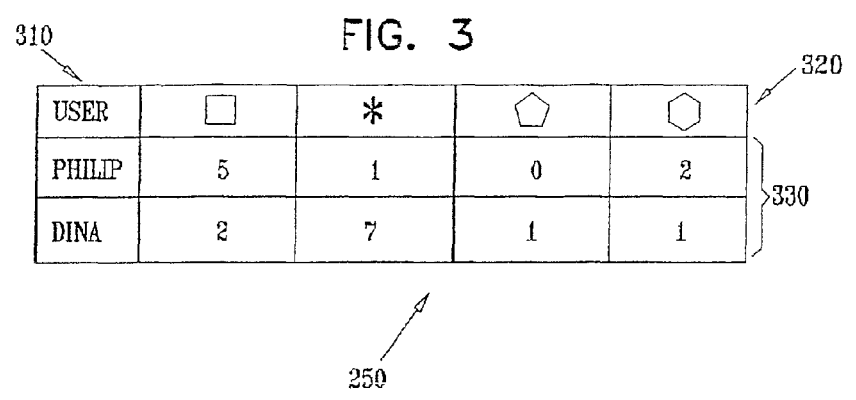

Reference is now made to FIG. 3, which is a simplified illustration of a table of advertisement points comprised in AIMs 250 as stored in the memory of a CDU, useful for understanding the system of FIGS. 1 and 2. In the example illustrated in FIG. 3, each AIM has a value of one advertisement point. The table 250 comprises a matrix of users 310 and types of points comprised in AIMs 320. A cumulative entry 330, representing total points accumulated per type of AIM per user, is made in an appropriate row and column of the table 250 for each advertisement point stored. As advertisement points are used up as described below, the cumulative entry 330 is preferably decremented appropriately as described below with respect to FIG. 10. In some preferred embodiments AIM usage is periodically reported to a central authority. In such embodiments, the CDU also tracks cumulative totals of used AIMS, so that the cumulative totals may be reported to the central authority.

Figure 4:
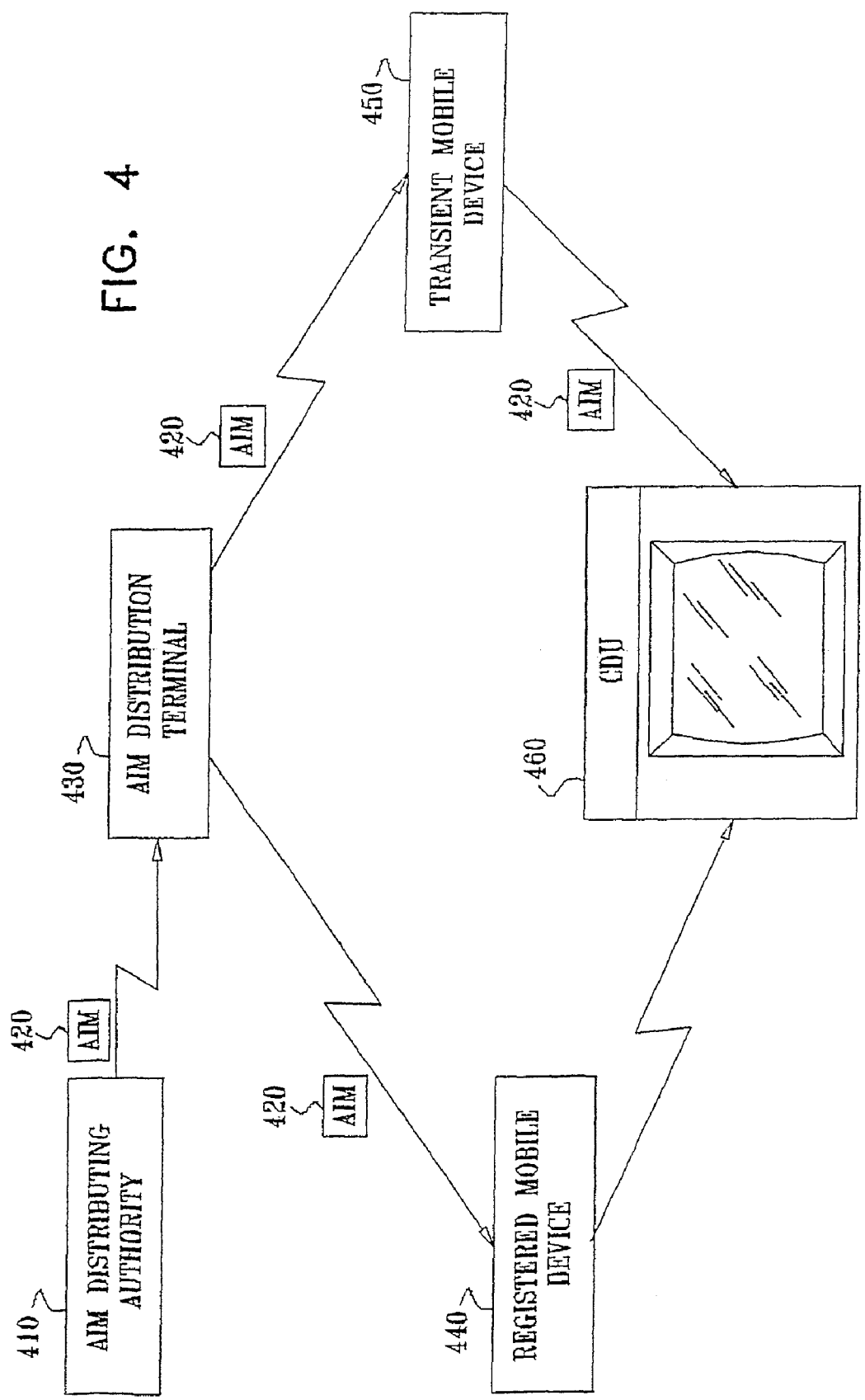
FIG. 4 is a generalized block diagram illustration of a preferred implementation of the system of FIGS. 1 and 2.

Reference is now made to FIG. 4, which is a generalized block diagram illustration of a preferred implementation of the system of FIGS. 1 and 2. In the system of FIG. 4, an AIM distributing authority 410 sends at least one AIM 420 to an AIM distribution terminal 430. The AIM distribution terminal 430 distributes the at least one AIM 420 to mobile devices 440 registered on-a home CDU 460 and mobile devices 450 which are not registered on the home CDU 460. Either or both of the registered mobile device 440 and non-registered mobile device 450 send at least one AIM 420 to the CDU 460. The CDU 460 plays out, at an appropriate time, an advertisement.

It is appreciated that various subcombinations of the elements of FIG. 4 may each also comprise an alternative preferred embodiment of the present invention. For example, each of the following may comprise an alternative preferred embodiment of the present invention:
 the AIM distribution terminal 430;
 the mobile device 440;
 the CDU 460;
 the AIM distribution terminal 430 in combination with the mobile device 440; and
 the mobile device 440 in combination with the CDU 460.

Figure 5:
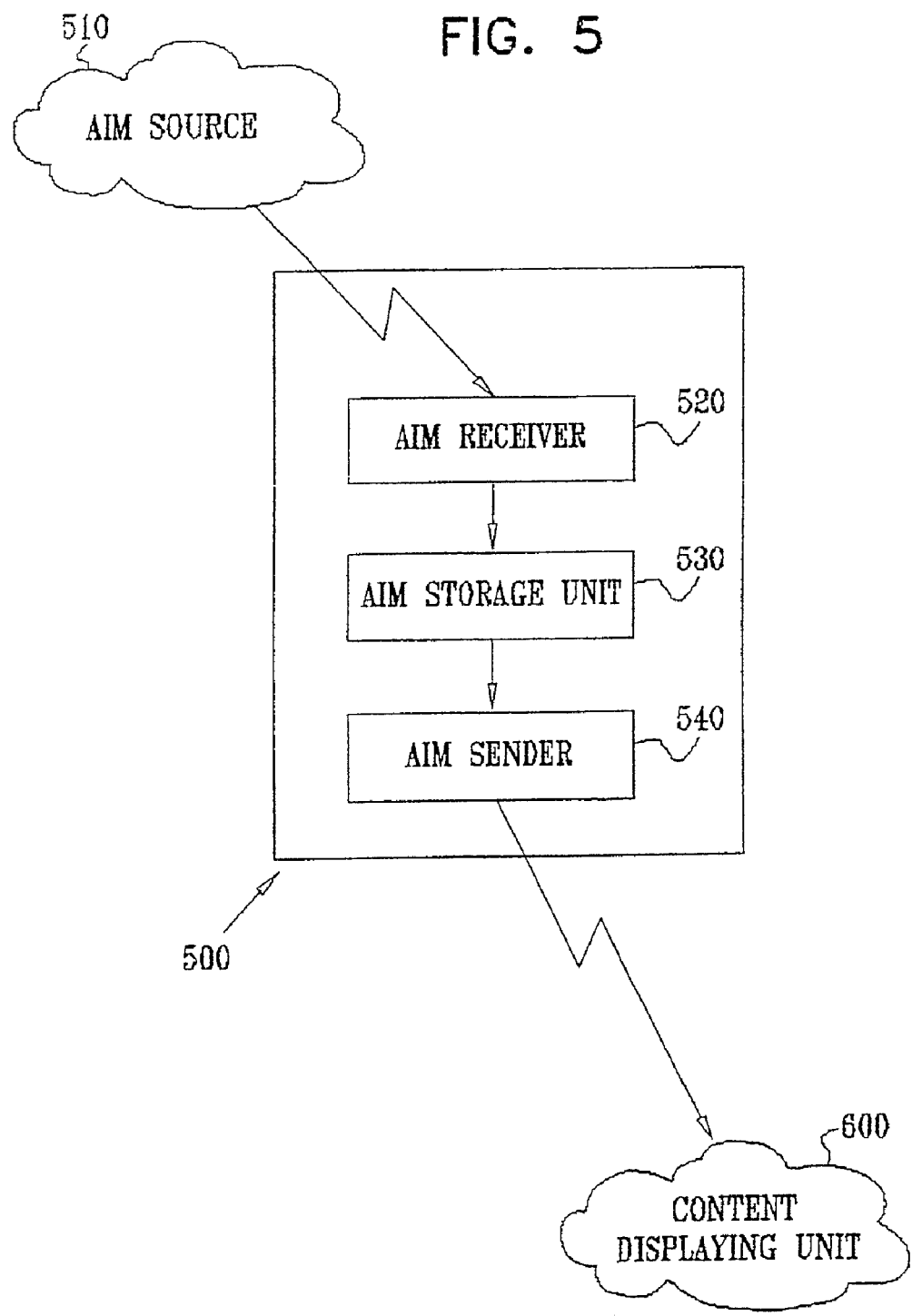
FIG. 5 is a generalized block diagram illustration of a preferred implementation of a mobile device in the system of FIGS. 1 and 2.

Reference is now made to FIG. 5, which is a generalized block diagram illustration of a preferred implementation of a mobile device in the system of FIGS. 1 and 2. The mobile device 500 is preferably implemented in any appropriate combination of hardware and software. The generic mobile device 500 of FIG. 5 corresponds to any of the various mobile devices illustrated in FIGS. 1 and 2 such as mobile phones 105 and 145 and PDAs 125 and 165. Conventional components of mobile phones, PDAs and similar devices are not shown for purposes of simplicity and clarity of depiction.

The mobile device 500 preferably comprises an AIM receiver 520, an AIM storage unit 530 and an AIM sender 540. The mobile device 500, via any appropriate wireless protocol, preferably receives at least one AIM (not shown in FIG. 5) from an AIM source 510. The at least one AIM is preferably received at the AIM receiver 520. The AIM receiver 520 preferably transfers the at least one AIM to the AIM storage unit 530. The at least one AIM is stored in the AIM storage unit 530. If the mobile device is in proximity of a CDU 600 upon which the mobile device is registered, the AIM storage unit 530 transfers the at least one AIM to the AIM sender 540. Alternatively, if the mobile device is in proximity of a CDU 600 upon which the mobile device is not registered, the AIM storage unit 530 transfers the at least one AIM to the AIM sender 540 only if the AIM is to be used by the CDU. The AIM sender 540, using any appropriate wireless protocol, transfers the at least one AIM to the CDU 600.

Transfer of AIMs, whether from the AIM source 510 to the AIM receiver 520, or from the AIM sender 540 to the CDU 600 preferably comprises secure transfer. For example, and without limiting the generality of the foregoing, the AIM is RSA signed using a private key provided in a device certificate. Security information added to the AIM is referred to in the present specification as a "security wrapper". The security wrapper may preferably be provided by the advertisement aggregator or, alternatively, by the AIM distribution terminal.

The mobile device 500 may preferably be registered with the CDU 600 in the home. Registration links the mobile device 500 to the CDU 600 in a permanent or semi-permanent way, but is preferably revocable through an "unregistration" process canceling the original registration. Preferably, two different types of registration processes, comprising a complex registration process and a basic registration process, are provided. The complex registration process preferably establishes a one-to-many relationship between one mobile device 500 and many CDUs 600. It is appreciated that a plurality of mobile devices may each undergo the complex registration process, thereby establishing a many-to-many relationship between the plurality of mobile devices and many CDUs 600. The basic registration process establishes a one-to-one relationship between one mobile device 500 and only one CDU 600. In addition, several different mobile devices 500 can execute the basic registration process with one CDU 600.

It is appreciated that more than one registered device may be associated with a particular individual. For example, and without limiting the generality of the foregoing, Philip 160 (FIG. 2) may have PDA 165 (FIG. 2) as well as a mobile phone and a pager (neither of which is shown), both of which are also registered devices.

In the complex registration process, for example, a mobile device 500 may preferably be linked to all the CDUs 600 in the home and all the residents may link their personal devices to the CDUs 600 in the public areas of the home, whereas only the parents' personal devices are linked to a TV in the parents' bedroom.

Registration thus preferably comprises listing the mobile device 500 in the CDU 600, by issuing a unique shared registration number that is stored in both the CDU 600 and the mobile device 500. Preferably, secure identity exchange between the mobile device 500 and the CDU 600 is performed based on random challenge using public key authentication schemes. For example, and without limiting the generality of the foregoing, public key authentication schemes such as X.509, IpSec or SSL may preferably be used. The registration process may optionally include entry of personal user information, such as, for example, one or more of the following: name; role in household; password; credit card or e-wallet information; and any other appropriate information. Personal information is useful for other functions; for example, and without limiting the generality of the foregoing, personal information may be useful in interactive television applications. The personal information is preferably guarded by mechanisms to protect privacy, as are well known in the art, to ensure that the personal information is not revealed when the CDU 600 performs functions for which personal information is not required.

Registration is preferably initiated when the CDU 600 or mobile device 500 detect each other. If the mobile device has never been registered before, the mobile device preferably triggers a message to the user either on a screen on the mobile device 500, or on a screen associated with the CDU 600. Alternatively a user may initiate the registration process through a menu entry available in either the screen on the mobile device 500, or on the screen associated with the CDU 600. Registration is preferably user initiated in the complex registration scheme, described above, when the mobile device is already registered with at least one CDU.

In the basic registration process, a mobile device 500 is registered in one and only one CDU 600 at a time. Before the mobile device 500 can be registered elsewhere, the mobile device preferably revokes initial registration—for instance, registration might use Frank Stajano's Resurrecting Duckling scheme as described in *Security for Ubiquitous Computing*, referred to above, on pages 88-105. Under this approach, all AIMs may only be loaded into the particular CDU 600 where the mobile device 500 is registered Alternatively, in the basic registration method, loading the AIMs only when they are to be used by the display device can support transitory use.

By contrast to the basic registration process, in the complex registration process, the mobile device 500 can preferably be registered in a plurality of CDUs 600. The complex process is preferably similar as the basic process described above, except that, in the advanced registration process a mobile device 500 stores many registration records. Because the mobile device 500 may preferably be registered in many CDUs, in embodiments using the complex registration process, AIMs are preferably not transferred automatically from the mobile device 500 to one of a plurality of CDUs. When multiple registrations exist, AIMs are preferably transferred in one or more of the following cases:

the AIMs have been used, as in the case of a guest, described with reference to FIG. 7;

the user explicitly requests that AIMs be transferred via a menu or other method; and the user establishes a user profile during registration that specifies whether AIMs should be transferred, and under which conditions AIMs should be transferred, and to which CDUs. For example, and without limiting the generality of the foregoing, the user profile can specify that AIMs whose category is associated with personal items may only be transferred to a particular CDU in the user's bedroom.

It is appreciated that in the preferred embodiment where the mobile device 500 may preferably be registered in many CDUs, and nonetheless a particular mobile device is registered in only one CDU, the particular mobile registered in only one CDU device will only transfer AIMs to that one CDU.

Figure 6:
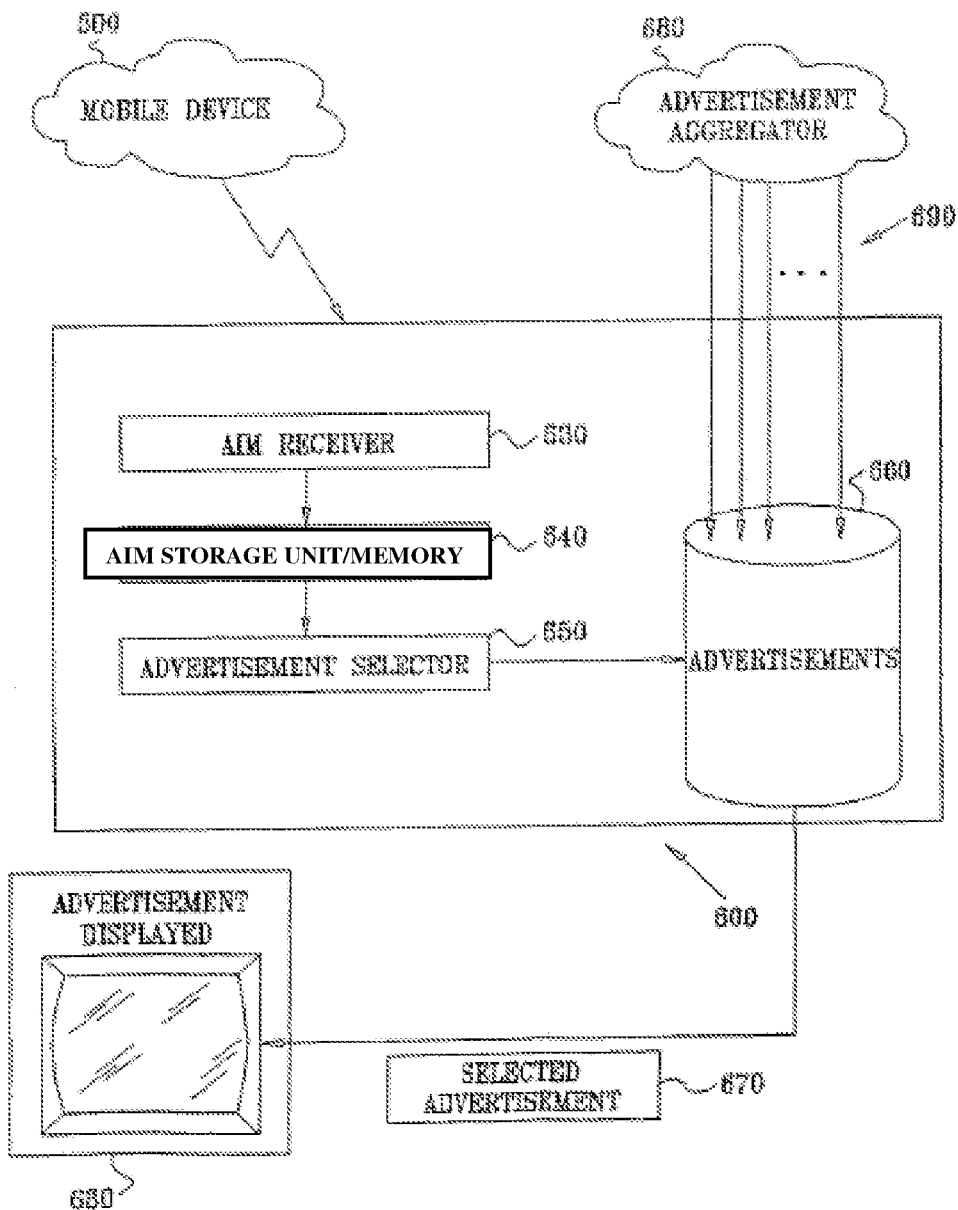
FIG. 6 is a generalized block diagram illustration of a preferred implementation of a CDU in the system of FIGS. 1 and 2.

Reference is now made to FIG. 6, which is a generalized block diagram illustration of a preferred implementation of a CDU in the system of FIGS. 1 and 2. The CDU 600 is preferably implemented in any appropriate combination of hardware and software. The generic CDU 600 of FIG. 6 corresponds to CDU 220, comprised in the set-top box or PVR of FIG. 2. The mobile device 500, using any appropriate wireless protocol, transfers at least one AIM (not shown in FIG. 6) to the CDU 600. The CDU 600 preferably comprises an AIM receiver 630, an AIM storage unit 640, and an advertisement selector 650. The at least one AIM is received in the CDU 600 by the AIM receiver 630. The at least one AIM is transferred by the AIM receiver 630 to the AIM storage unit 640. The at least one AIM is preferably stored in the AIM storage unit 640. At an appropriate time, preferably based on a method described below with reference to FIG. 10, the advertisement selector 650 comprised in the CDU selects at least one advertisement 670 for display. Selection criteria for selecting the at least one advertisement 670 are preferably based, at least in part, on advertisements 660 stored on storage media comprised in the CDU, as well as other criteria discussed below with reference to FIG. 10. The selected advertisement 670 is displayed on a CDU display screen, and the used AIMs are marked as used on the AIM storage unit 640. Advertisement points associated with the used AIMs are also marked as used. Deletion of advertisement points marked as used and AIMs marked as used may occur immediately. Alternatively, deletion of advertisement points marked as used and AIMs marked as used may occur only after the advertisement points marked as used and AIMs marked as used have been reported, as described below with reference to FIG. 14.

The advertisements 660 stored in the CDU 600 are preferably delivered to the CDU 600 by an advertisement aggregator 680 in a plurality of data streams 690 comprising advertisements.

Figure 7:
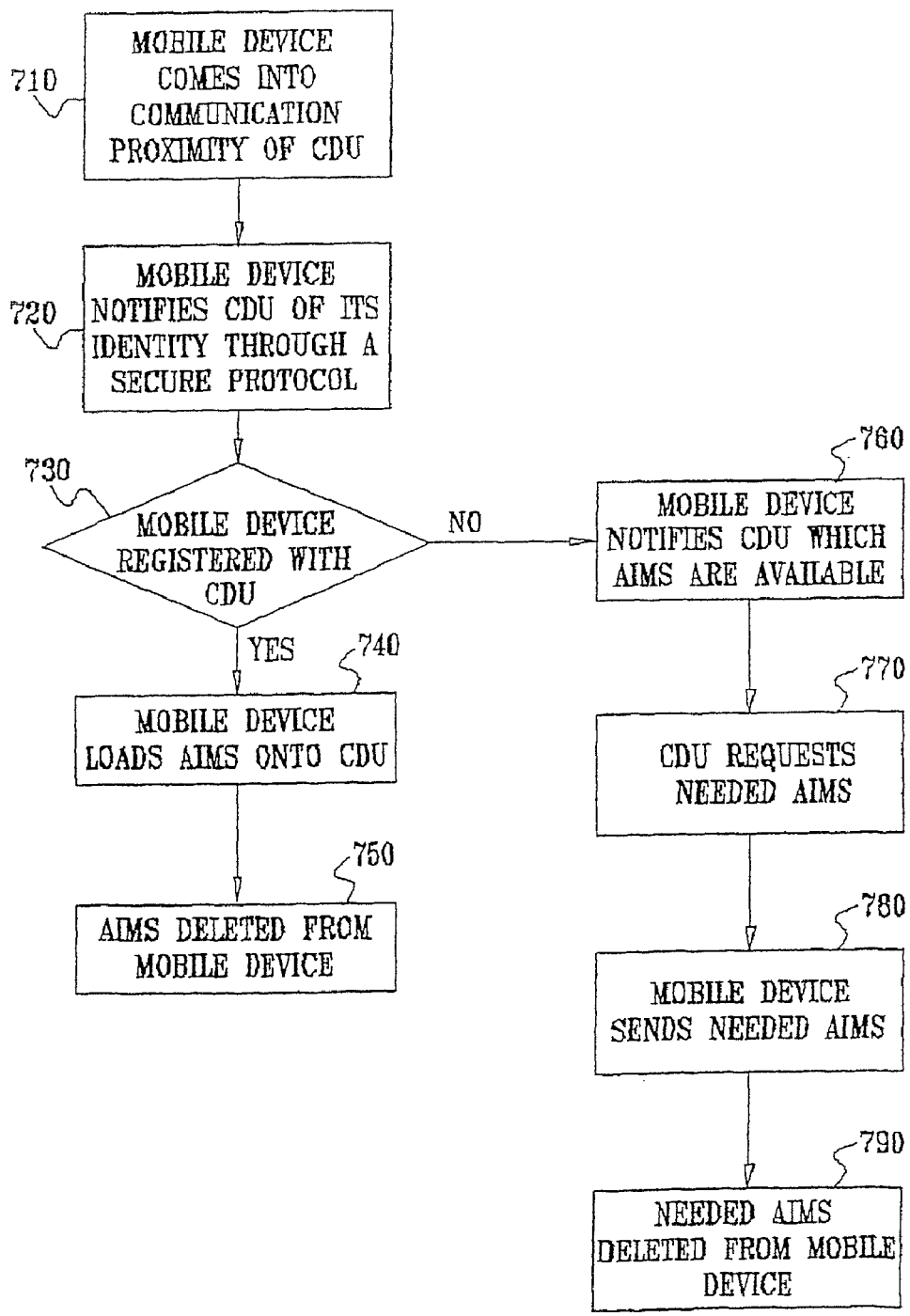
FIG. 7 is a simplified flowchart illustration of a preferred method of operation of the system of FIGS. 1 and 2, for transferring AIMs from a mobile device to a CDU.

Reference is now made to FIG. 7, which is a simplified flowchart illustration of a preferred method of operation of the system of FIGS. 1 and 2, for transferring AIMs from a mobile device to a CDU. The mobile device comes into communication proximity of a CDU (step 710). It is appreciated that communication proximity depends on the specific wireless protocol implemented, as is well known in the art. The mobile device preferably notifies the CDU of its identity through any appropriate secure protocol (step 720). It is appreciated that a secure protocol is used in order to prevent tampering with the system; use of a secure protocol is therefore strongly preferred. For example, and without limiting the generality of the foregoing, in the absence of a secure protocol, it is easier to tamper with the system and inject counterfeit AIMs to a CDU, in order to bias which advertisements are played out; such tampering would be undesirable.

The CDU preferably determines if the mobile device is registered or not (step 730) by comparing the identity stored in the mobile device (described above with reference to FIG. 5, in discussing the registration process) with the list of registered users stored in the CDU (described above with reference to FIG. 3). If the mobile device is registered with the CDU, the mobile device preferably securely transfers the AIMs it has accumulated onto the CDU (step 740). Once the AIMs are loaded onto the CDU, the AIMs are deleted from the mobile device (step 750).

It is appreciated that the loading of AIMs onto the CDU and the deleting of AIMs from the mobile device in step 750 preferably occurs in several steps. For example, and without limiting the generality of the foregoing, AIMs stored on the mobile device are preferably marked as pending deletion upon transfer. The AIMs marked pending deletion are preferably deleted after a timeout, unless a resend request is received from the CDU. Alternatively, the AIMs marked as pending deletion are preferably deleted from the mobile device when confirmation of receipt is received from the CDU. In theory, it may even occur that deleting of AIMs from the mobile device may happen before the AIMs are finished loading on the CDU.

Throughout the present specification and claims, the term "push", in all of its grammatical forms refers to push technology, a data distribution technology in which selected data is automatically delivered into a user's receiving device at prescribed intervals or based on some event that occurs.

If the CDU determined that the mobile device is not a registered device in step 730, or if the mobile device is registered on a plurality of CDUs, no AIMs are immediately transferred. Rather, the mobile device, using an appropriate secure protocol, notifies the CDU which AIMs are available (step 760). In some preferred implementations of the present invention, the user may push AIMs from the not-registered device into the CDU. For example, and without limiting the generality of the foregoing, the user may wish to spend time watching music videos on a CDU on which his mobile device is not-registered. In such a case, the user may desire to push his AIMs and use the AIMs to "purchase" the music videos. When an opportunity to display an advertisement occurs, the CDU preferably determines, based on available AIMs, which advertisement to play out, preferably as explained below with reference to FIG. 10. Based on the choice of advertisement, the CDU preferably requests the AIMs needed to play out the advertisement from the non-registered mobile device (step 770). Using an appropriate secure wireless protocol, the mobile device transfers the needed AIMs to the CDU (step 780). The transferred AIMs are preferably deleted from the mobile device (step 790).

Figure 8:
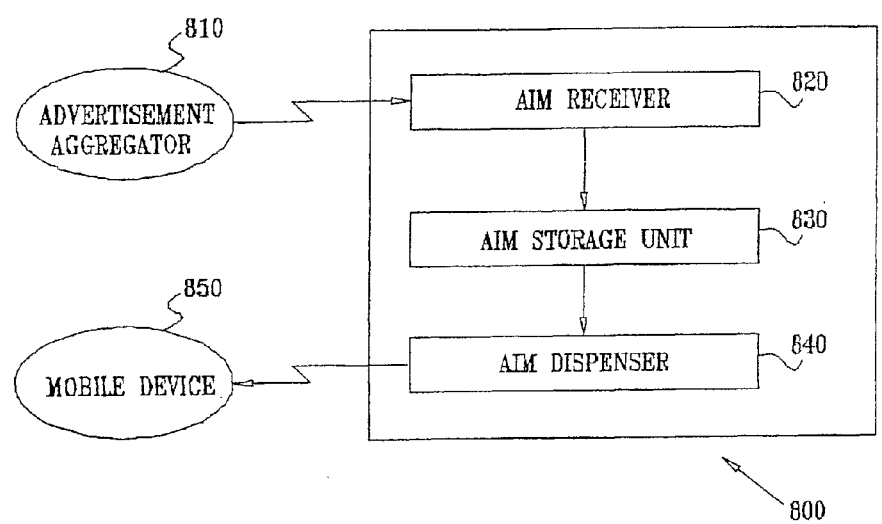
FIG. 8 is a generalized block diagram illustration of a preferred implementation of an AIM distribution terminal.

Reference is now made to FIG. 8, which is a generalized block diagram illustration of a preferred implementation of an AIM distribution terminal 800. The AIM distribution terminal 800 is implemented in any appropriate combination of hardware and software. The AIM distribution terminal 800 of FIG. 8 corresponds to the source of the AIMs in the various scenarios depicted in FIG. 1, preferably being comprised in the shop 103, the store 123, the airport 143 and the car wash 163. An advertisement aggregator 810, or some other appropriate AIM distributing authority, distributes at least one AIM to at least one AIM distribution terminal 800 using an appropriate secure protocol.

The AIM distribution terminal 800 preferably comprises an AIM receiver 820 an AIM storage unit 830, and an AIM dispenser 840. The AIM receiver 820 is preferably operative to securely receive at least one AIM from the advertisement aggregator 810. The at least one AIM received is sent for secure storage in the AIM storage unit 830. At a time when a mobile device 850 is in communication proximity, the AIM dispenser 840, using an appropriate wireless protocol, securely dispenses at least one AIM to the mobile device 850. Responsibility for providing the security and preferred methods for securing AIMs are discussed above with reference to FIG. 5.

Figure 9:
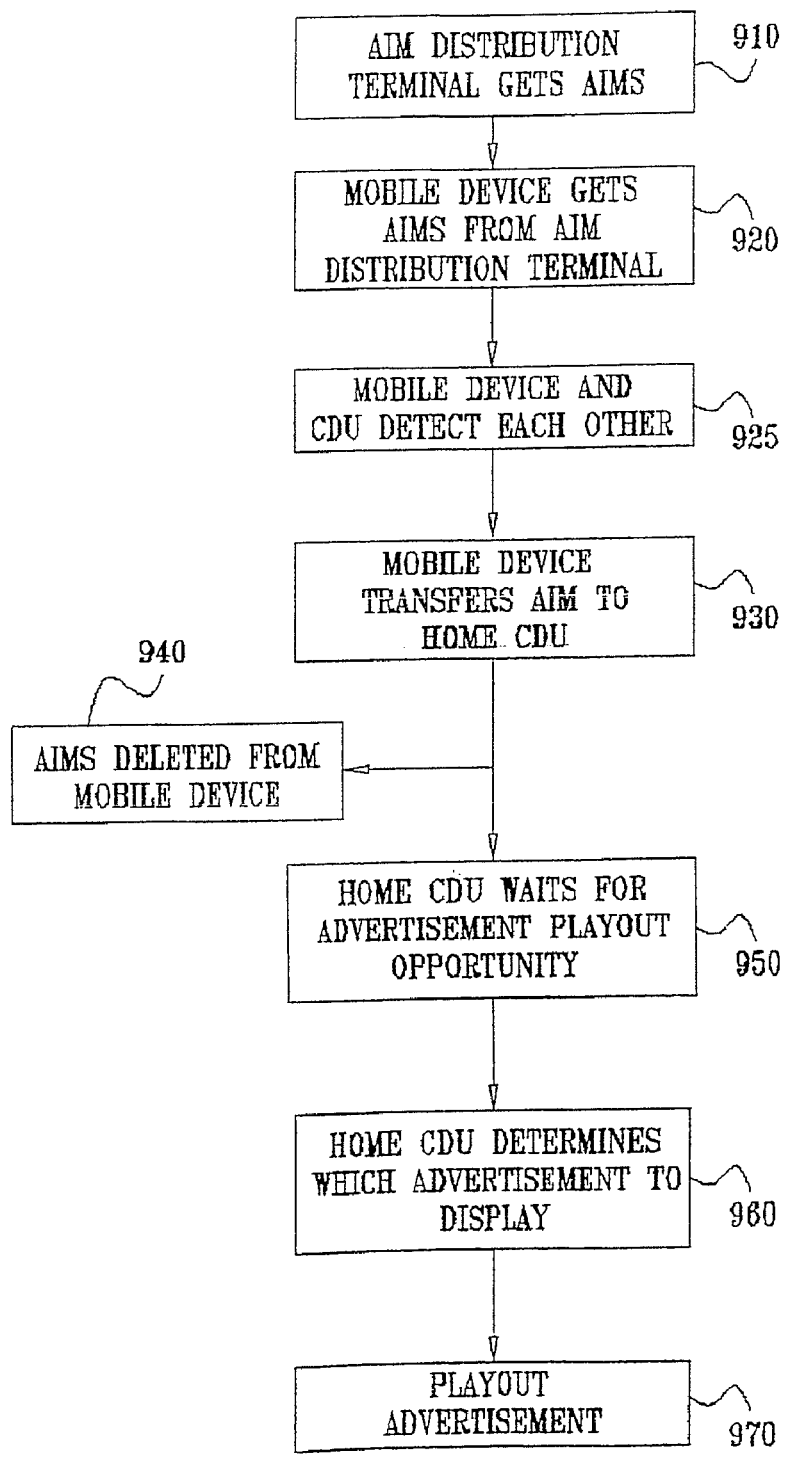
FIG. 9 is a simplified flowchart illustration of a preferred method of operation of the CDU of FIG. 6 when located in a home.

Reference is now made to FIG. 9, which is a simplified flowchart illustration of a preferred method of operation of the CDU of FIG. 6 when located in a home. The AIM distribution terminal receives AIMs (step 910). When the mobile device is within communication proximity of the AIM distribution terminal, the AIM distribution terminal transfers AIMs onto the mobile device (step 920). It is appreciated that in some preferred-embodiments, the mobile device may request AIMs from the AIM distribution terminal, and in alternative preferred embodiments, the AIM distribution terminal pushes AIMs onto the mobile device. When the mobile device is in communication proximity of the home CDU, the mobile device and the CDU detect each other (step 925), preferably through the polling process, described above with reference to FIG. 2. The mobile device transfers loaded AIMs to the home CDU (step 930). Once transferred to the home CDU, the AIMs are deleted from the mobile device (step 940). In some preferred implementations of the present invention, the user may push AIMs in the not-registered device into the CDU, as explained above with reference to FIG. 7.

The home CDU waits for an appropriate advertisement playout opportunity (step 950). At an appropriate advertisement play out opportunity, the home CDU determines which advertisement to display (step 960). The CDU then plays out advertisements (step 970).

Figure 10:
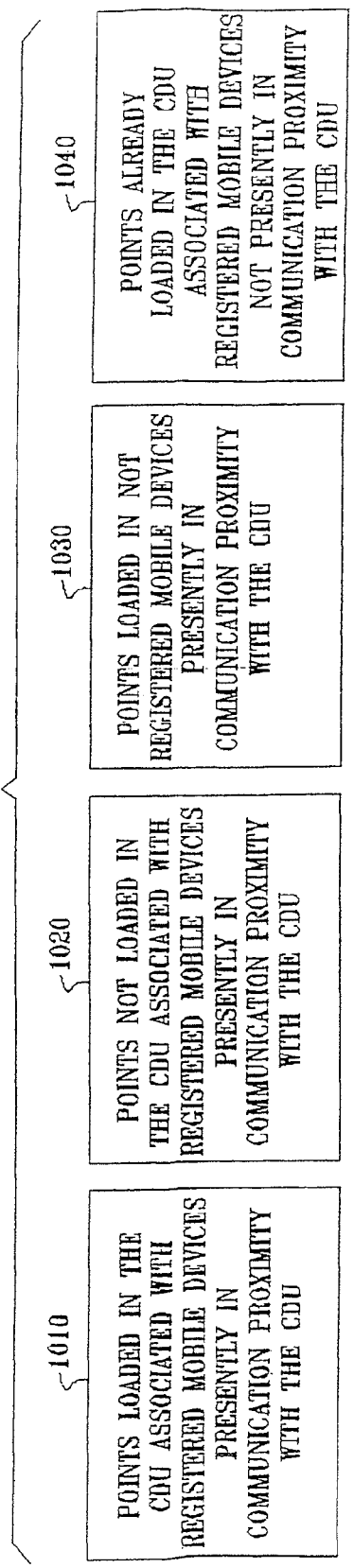
FIG. 10 is a generalized block diagram illustration showing preferred criteria used for determining which advertisements are displayed on a CDU.

Reference is now made to FIG. 10, which is a generalized block diagram illustration showing preferred criteria used for determining which advertisements are displayed on a CDU in step 960 of FIG. 9. At least one of the following criteria depicted in FIG. 10 preferably have an effect on which advertisements are displayed on the CDU:

Points loaded in the CDU associated with registered mobile devices presently in communication proximity with the CDU (1010);

Points not loaded in the CDU associated with registered mobile devices presently in communication proximity with the CDU (1020);

Points loaded in not-registered mobile devices presently in communication proximity with the CDU (1030);

Points already loaded in the CDU associated with registered mobile devices not presently in communication proximity with the CDU (1040);

Metadata defining the advertisement category ID, explained in more detail below with reference to FIG. 12; and Advertisements stored in the CDU database.

Reference is now made back to FIG. 3. For example, and without limiting the generality of the foregoing, at an appropriate time to display an advertisement, the advertisement selector, shown as 650 in FIG. 6, consults the table of advertisement points comprised in AIMs 250. In the example table of advertisement points comprised in AIMs 250 there are more star category advertisement points than advertisement points of any other category. If both registered users Philip and Dina are present, an advertisement corresponding to the star category of AIM would be displayed. If such an advertisement is not available in the CDU database, the CDU would preferably search for an advertisement corresponding to the category with the next number of advertisement points. Consulting the example table of advertisement points comprised in AIMs 250, an ad associated with the square category of advertisement points would be displayed.

It is appreciated that an advertisement may belong to more than one category. For example, and without limiting the generality of the foregoing, an advertisement may cost either 2 star advertisement points or 3 square advertisement points.

It is further appreciated that when the registered user has more than one registered device, as explained above with reference to FIG. 5, the presence of one device registered to a user links to all the AIMs, and advertisement points comprised therein, from any device associated with that user.

However, if only registered user Philip is present, then Dina's advertisement points are preferably given lower priority, so that there are more square category advertisement points than advertisement points of any other category. In such a case, an advertisement corresponding to the square category of AIM is preferably displayed.

When more advertisement points for a given category of advertisement points are available than are needed to display an advertisement for that given category, the following criteria are preferably used to determine which advertisement points are deleted:

advertisement points are categorized into three groups:
1. advertisement points from currently present, registered users;
2. advertisement points from currently present, transitory users; and
3. advertisement points from not present, registered users.

Persons skilled in the art will appreciate that any number of appropriate schemes may be devised to determine which weighting to give according to previously loaded AIMs, presence and absence of registered users and guests. For example, and without limiting the generality of the foregoing, the CDU is preferably configurable to adopt one of the two following schemes for prioritizing from which user to deduct advertisement points:

I. First deduct advertisement points from currently present, registered users; then deduct advertisement points from currently present, transitory users; and lastly deduct advertisement points from not present, registered users; or II. First deduct advertisement points from currently present, registered users; then deduct advertisement points from not present, registered users and lastly deduct advertisement points from currently present, transitory users.

Referring back to the final pane of FIG. 2, both registered users Philip and Dina are present, and guest Tom is also present. Taking into account the advertisement points available on Tom's mobile device, there are more star category advertisement points than advertisement points of any other category. In such a case, an advertisement corresponding to the star category of advertisement points is preferably displayed.

Figure 11:
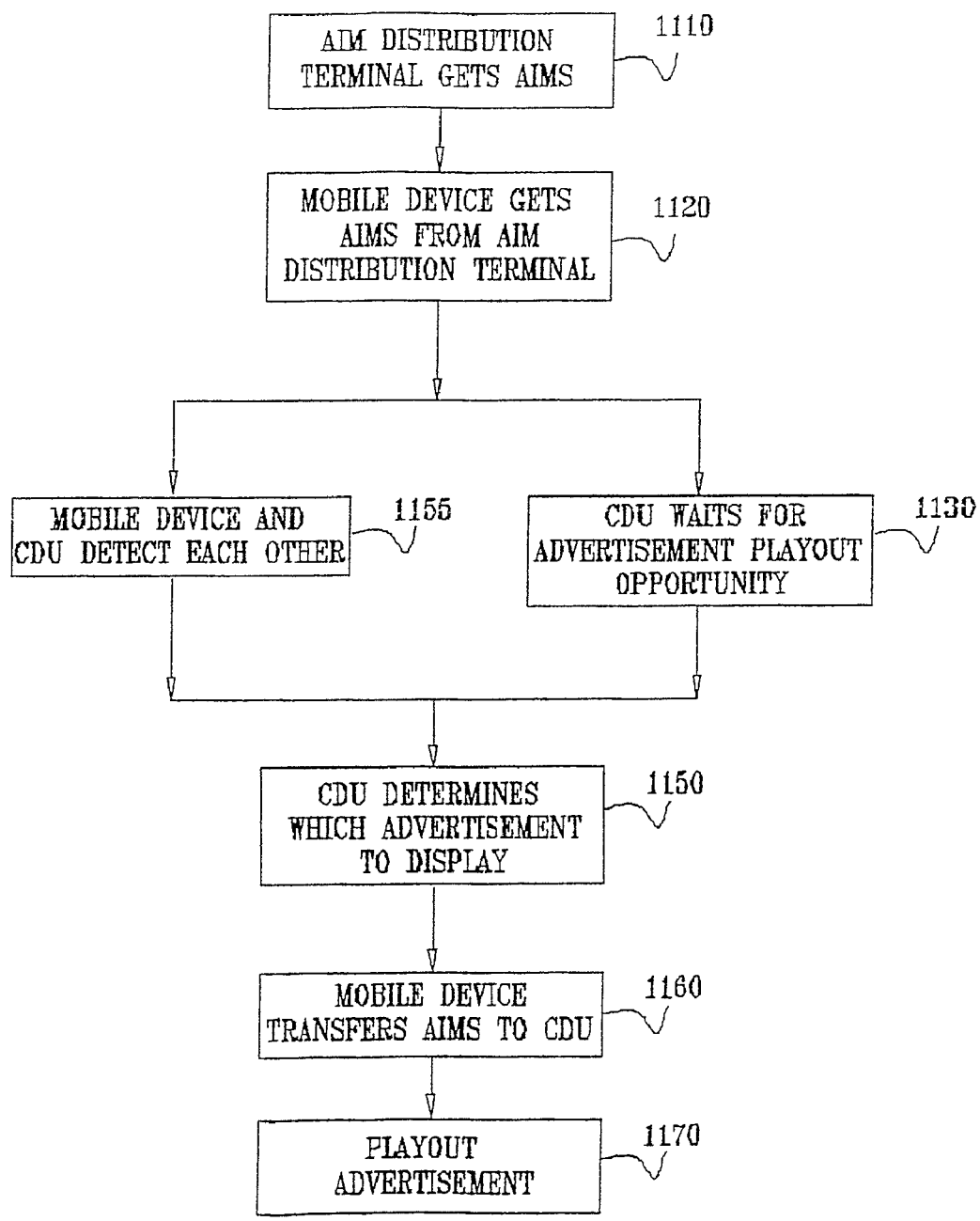
FIG. 11 is a simplified flowchart illustration of a preferred method of operation of the CDU of FIG. 6 when not located in a home.

Reference is now made to FIG. 11, which is a simplified flowchart illustration of a preferred method of operation of the CDU of FIG. 6 when not located in a home. An AIM distribution terminal receives AIMs (step 1110). When a mobile device is within communication proximity of the AIM distribution terminal, the mobile device gets AIMs from the AIM distribution terminal (step 1120). A not-at-home CDU waits for an opportunity to play out an advertisement (step 1130). Once the mobile device is in communication proximity of the not-at-home CDU, the mobile device and the CDU detect each other (step 1155) through the polling process, described above with reference to FIG. 2. When an advertisement playout opportunity occurs on the not-at-home CDU, the not-at-home CDU determines which advertisement to display (step 1150). The mobile device transfers the AIM used for playing out the advertisement to the not-at-home CDU (step 1160). The not-at-home CDU plays out the advertisement (step 1170).

It is appreciated that steps 1130 and 1155 may occur whenever appropriate, that is, asynchronously with respect to each other.

Figure 12:
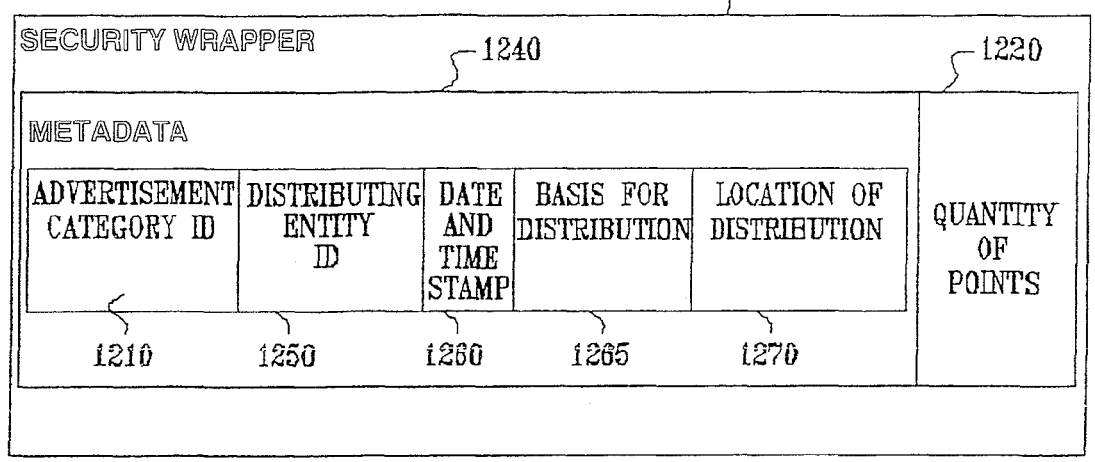
FIG. 12 is a generalized block diagram illustration of a preferred implementation of an AIM.

Reference is now made to FIG. 12, which is a generalized block diagram illustration of a preferred implementation of an AIM. An AIM preferably comprises a metadata header 1240. The metadata header 1240 preferably comprises an advertisement category ID 1210, which ID signifies to which advertisement category a given AIM belongs. For example, and without limiting The generality of the foregoing, an AIM might have category ID 0 for Grepsi Cola, category ID 1 for Fats Pizza, or category ID 1000 for Penguin Air Conditioners. The metadata 1240 also preferably comprises an identifier 1250 of an entity that distributes the AIM and a record 1260 of the date and time on which the AIM was distributed to the mobile device (date and time is preferably recorded, for example, to allow a statistical analysis of buying patterns). In addition, in some preferred embodiments of the present invention AIM metadata also optionally comprises any of the following:

basis for distribution 1265, for example, and without limiting the generality of the foregoing, comprising a category such as purchase of item, interaction with sales team, or "walk-by" AIM;

location of distribution 1270, for example, and without limiting the generality of the foregoing, category such as store, billboard, train station;

geographic location of distribution point (not shown); and specific distributor location code (not shown), giving an identification code for a particular store within a chain of stores, for example, and without limiting the generality of the foregoing, the Super Supermarket chain Main St. Anywhere, N.J. supermarket.

A quantity of points 1220 is also preferably comprised in the AIM. The metadata 1240 and quantity of points 1220 are preferably enclosed in a security wrapper 1230 designed to protect the AIM from tampering. A preferred implementation of the security wrapper is described above with reference to FIG. 5.

Figure 13:
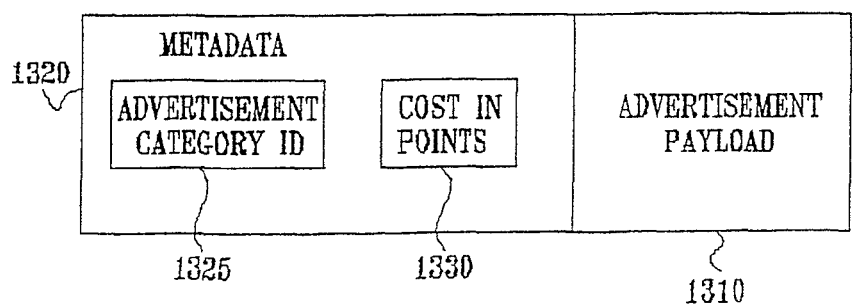
FIG. 13 is a generalized block diagram illustration of a preferred implementation of an advertisement.

Reference is now made to FIG. 13, which is a generalized block diagram illustration of a preferred implementation of an advertisement. The advertisement preferably comprises an advertisement payload 1310 and metadata 1320. The metadata 1320 preferably comprises:

an advertisement category identifier 1325 identifying to which advertisement category the advertisement payload 1310 belongs; and an advertisement cost 1330 specifying a number of advertisement points which are preferably deducted from the table of advertisement points comprised in AIMs 250 (FIG. 3), after the advertisement is displayed on a CDU. A preferred method for deducting advertisement points from the table of advertisement points comprised in AIMs is described with reference to FIG. 10.

The advertisement payload 1310 preferably comprises any one or combination of the following: video; audio; interactive data; and other data displayed or made available when the ad is played out, as is known in the art.

Figure 14:
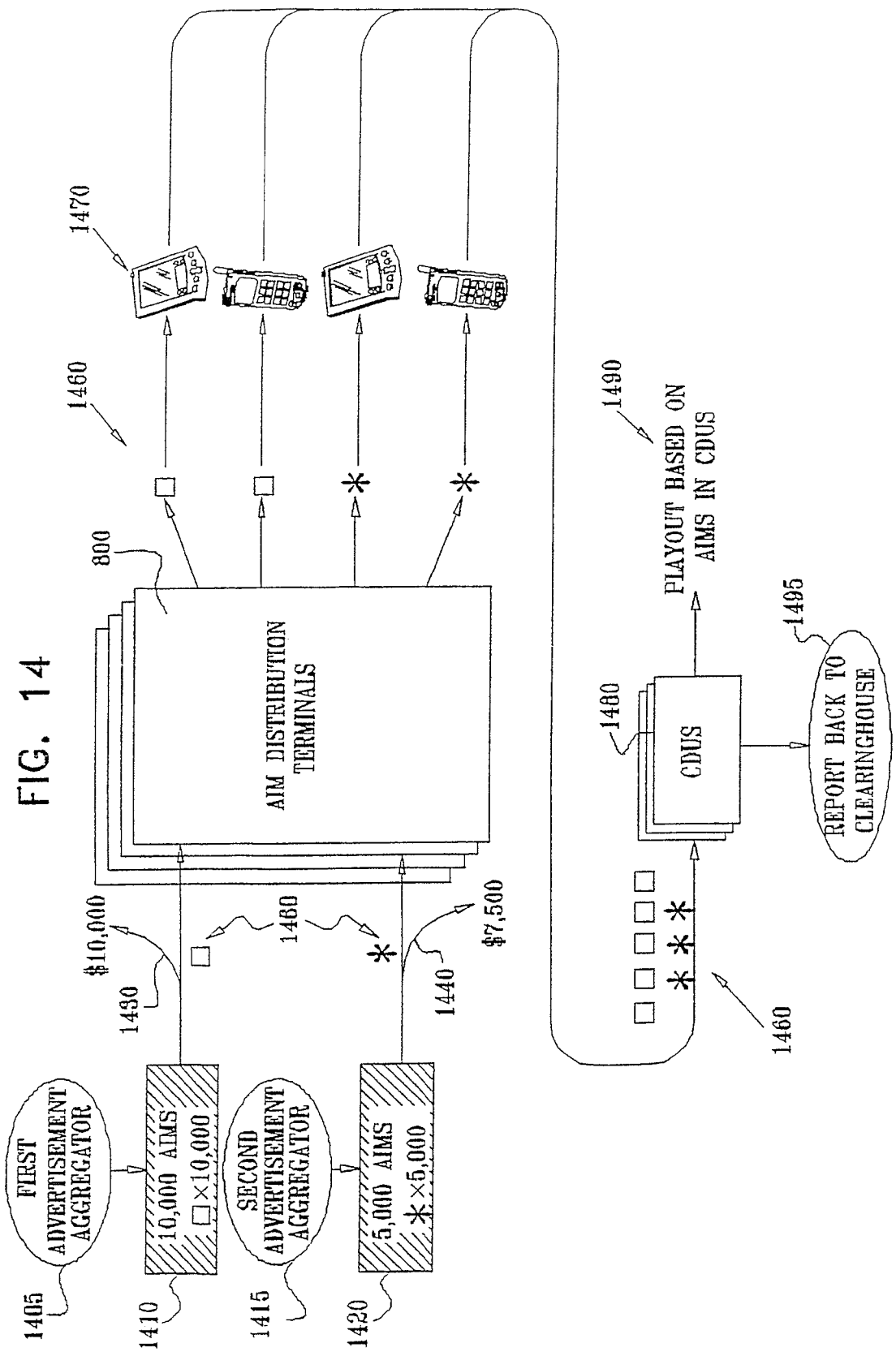
FIG. 14 is a simplified partly pictorial, partly block illustration of a model for effective use of the system of FIGS. 1 and 2.

Reference is now made to FIG. 14, which is a simplified partly pictorial, partly block illustration of a model for effective use of the system of FIGS. 1 and 2. Advertisement aggregators or other comparable AIM distributing authorities preferably sell AIMs to advertisers. The price of an AIM may vary depending on a variety of factors. For example and without limiting the generality of the foregoing, the price of an AIM may vary depending on any one or combination of the following: the advertisement aggregator; the product advertised; the company doing the advertising; the business relationship between the advertisement aggregator and the company doing the advertising; and any other appropriate factor.

A first advertisement aggregator 1405, or some other comparable AIM distributing authority, contracts with a first advertiser to provide 10,000 AIMs 1410. The 10,000 AIMs 1410, of a category relevant to the first advertiser, are denoted in FIG. 14 with a square. A second advertisement aggregator 1415, or some other comparable AIM distributing authority, contracts with a second advertiser to provide 5,000 AIMs 1420. The 5,000 AIMs 1420, of a category relevant to the second advertiser, are denoted in FIG. 14 with a star. The cost 1430 of the 10,000 AIMs to the first advertiser is, for example, $10,000, payable to the first advertisement aggregator 1405, or other comparable AIM distributing authority. The cost 1440 of the 5,000 AIMs to the second advertiser is, for example, $7,500, payable to the second advertisement aggregator 1415, or other comparable AIM distributing authority. The square and star category AIMs 1410 and 1420 are distributed by the first advertisement aggregator 1405 and the second advertisement aggregator 1415, or by some other comparable AIM distributing authority, to at least one AIM distribution terminal 800 using an appropriate secure protocol.

While two advertisement aggregators comprising the first advertisement aggregator 1405 and the second advertisement aggregator 1415 are shown in FIG. 14, it is appreciated that the first advertisement aggregator 1405 and the second advertisement aggregator 1415 may in fact comprise a single advertisement aggregator. Furthermore, while two advertisers comprising the first and second advertiser are referred to above in the discussion of FIG. 14, it is further appreciated that the first and second advertiser may in fact comprise a single advertiser. It is also appreciated that the square and star category AIMs 1410 and 1420 may both comprise points for different advertisements for the same product. For example, and without limiting the generality of the foregoing, two different and competing supermarket chains may have different advertisements for the same frozen pizza product.

The at least one AIM distribution terminal 800 distributes the square and star category AIMs 1460 to various mobile devices 1470. When the various mobile devices 1470 are in proximity with at least one CDU 1480, AIMs 1460 are transferred to the at least one CDU 1480. At an appropriate time the at least one C-DU 1480 plays out advertisements 1490 based on received AIMs 1460. Periodically, the at least one CDU 1480 will report back 1495 to a clearinghouse, the report preferably comprising information conceding which AIMs have been used and/or which advertisements have been used.

If all advertisements use only one point, and if each act of AIM distribution gives out one point only, the reporting can be simplified, as the AIM with its secure wrapper is all that need be reported. If multiple points are distributed in AIMs or multiple points are used to display advertisements, then a report preferably comprises: a total count of points used; metadata identifying the advertisements displayed; and a sub-report of AIMs used. The sub-report preferably comprises copies of at least one used AIM or excerpts thereof, preferably securely wrapped.

It is appreciated that the clearinghouse may comprise either or both of the first advertisement aggregator 1405 and/or the second advertisement aggregator 1415, or may comprise yet a third authority not shown in FIG. 14. The clearinghouse preferably relays reports related to the AIMs dispensed by each advertisement aggregator to the appropriate advertisement aggregator either directly or via said third authority.

Figure 15:
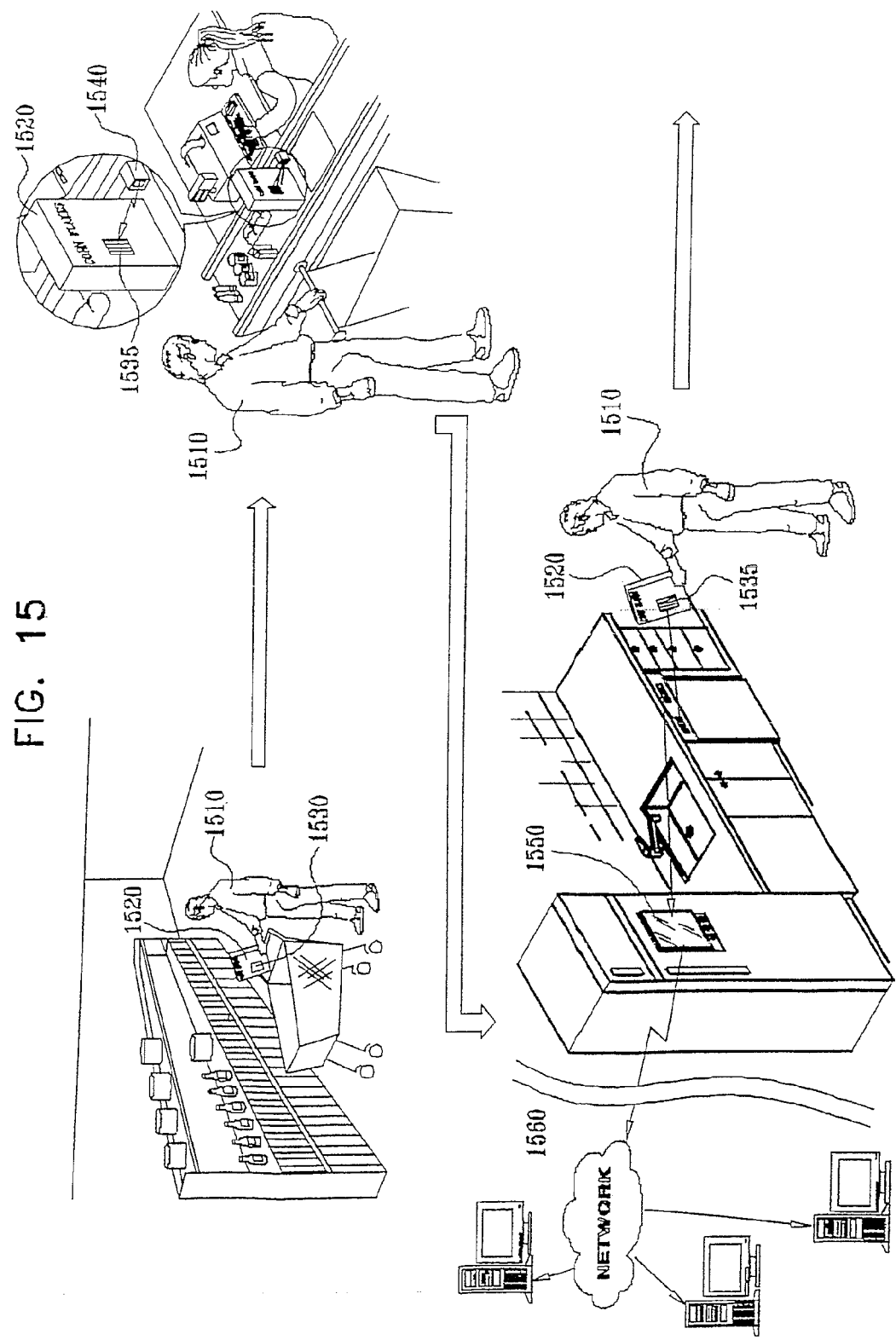

Reference is now made to FIGS. 15 and 16, which are simplified pictorial illustrations of a content delivery system, constructed and operative in accordance with an alternative preferred embodiment of the present invention. In the first pane of FIG. 15, a user 1510 is seen shopping for groceries. The user 1510 takes a box of cereal 1520 off a supermarket shelf. He places the box of cereal 1520 into his grocery cart. The box of cereal 1520 comprises an embedded integrated circuit chip 1530.

In referring to entitlements stored in the embedded chip 1530 and in the claims, the terms "enabled" and "disabled" are used, in all of their grammatical forms, to describe an attribute of the entitlement or entitlements. The term "disabled" is used to refer to an entitlement that is present, but which entitlement is marked in some way or has some attribute which prevents the entitlement from being used in any way. As described more fully below, such a disabled entitlement may be enabled, at which time the disabled entitlement becomes an enabled entitlement.

In referring to entitlements stored in the embedded chip 1530 and in the claims, the terms "active" and "inactive" are used, in all of their grammatical forms, to describe an attribute of the entitlement or entitlements, particularly although not necessarily exclusively an attribute of an enabled entitlement. Generally, an enabled entitlement may, as described more fully below, not yet be ready to be used; such an enabled entitlement is referred to as an "inactive" entitlement. An enabled entitlement that is ready to be used, as described more fully below, is referred to as an "active" entitlement.

In one preferred embodiment, while the box of cereal 1520 has not yet been purchased, the embedded chip 1530 stores a disabled entitlement for content, as will be explained below.

Referring now to the second pane of FIG. 15, when the user 1510 pays for the box of cereal 1520, an enabling device 1540 preferably enables the embedded chip 1530, preferably by sending a signal, preferably a secure signal, using any appropriate wireless protocol to the chip storing the entitlement. The signal preferably enables the entitlement for content stored in the embedded chip 1535. For the sake of clarity, and in order to distinguish between different states of the embedded chip, the embedded chip storing a disabled entitlement is associated with reference numeral 1530 and the embedded chip storing an enabled entitlement is associated with reference numeral 1535.

In an alternative preferred embodiment, while the box of cereal 1520 has not yet been purchased, the embedded chip 1530 does not yet store any entitlement for content. When the user 1510 pays for the box of cereal 1520, an enabling device 1540 preferably enables the embedded chip 1530, by securely sending the entitlement using any appropriate wireless protocol to the chip. A further step may be required to activate the entitlement, as explained below.

The entitlement preferably comprises at least: rights granted to content; a period that the rights are granted for; and a location-of-distribution identifier. The location-of-distribution identifier need not explicitly identify a particular item of content; mapping to a particular item of content may be carried out when the entitlement is used. For example, and without limiting the generality of the foregoing, the location-of-distribution identifier may grant rights to view one episode of a series of cartoons, without specifying which particular cartoon may be viewed. The particular cartoon, and hence the location of the particular cartoon, may be specified at a later time.

Referring now to the third pane of FIG. 15, once the user 1510 returns to his home, he brings the cereal box 1520 into proximity of a playout device 1550, thereby activating the enabled entitlement. The embedded chip 1535 and the playout device 1550 detect each other through a polling process, as described above. A location-of-distribution identifier, such as a URL, universal content identifier or other appropriate universal method of identifying and locating the content is preferably comprised in the entitlement stored in the embedded chip 1535. The entitlement is preferably transferred to the playout device 1550. At the time the entitlement is transferred to the playout device 1550, the entitlement may be deleted from the embedded chip 1535. Alternatively, when the entitlement is transferred to the playout device 1550, the entitlement may not be deleted from the embedded chip 1535. Using information comprised in the location-of-distribution identifier, the playout device 1550 preferably locates the content on the Internet or on a local network 1560, and requests the content.

Referring now to the first pane of FIG. 16, a server on the Internet or on a local network 1560 preferably receives the content and preferably responds to the request for content, preferably sending the content back to the playout device 1550. The playout device 1550 preferably presents a query 1610 to the user 1510 for authorization to start playout of the content. It is appreciated that the playout device 1550 may present a query 1610 for authorization to start playout of the content before the playout device 1550 locates the content on the Internet or on a local network 1560, and requests the content. The enabled entitlement is preferably activated in response to a positive response by the user to the query 1610. In an alternative preferred embodiment, the querying stage may be omitted, and playout may preferably occur automatically. It is appreciated that some embodiments of the playout device may be configurable to allow automatic playout, or may alternatively require manual confirmation by the user 1510 before beginning playout.

Referring now to the second pane of FIG. 16, the user 1510 preferably actuates an actuator 1620 or otherwise provides input to the playout device 1550, authorizing playout of the content. The playout device 1550 preferably then plays out the content 1630. Once the activated entitlement stored in the embedded chip 1530 is transferred to the playout device 1550, the entitlement is preferably no longer activated, and may no longer cause that content 1630 to play out. For example, and without limiting the generality of the foregoing, during the wireless transfer of the entitlement to the playout device 1550, the playout device may signal to the entitlement that the entitlement is no longer activated.

In alternative preferred embodiments, the entitlement could comprise an entitlement for: any one episode of a content series; content usage over a period of time or until an expiration date; or a specific number of playouts (for example and without limiting the generality of the foregoing, any episode may play out three times). In preferred embodiments in which the entitlement comprises more than an entitlement to an individual piece of content for one time viewing, the entitlement may preferably be preserved in the original embedded chip 1535, from where the entitlement can be sent to another playout device in the future. The entitlement may preferably be altered to indicate what usage has already occurred, and the entitlement may then be sent to other playout devices with reduced value, or may be deleted from the original embedded chip 1535. Usage management of the entitlement would now be handled in the playout device to which the entitlement was transferred Playing out of the content associated with the enabled entitlement as described above may occur either passively or actively:

Passively, with the option for the user to confirm that playout is desired. The user would preferably close a circuit thereby activating the enabled entitlement, for example, and without limiting the generality of the foregoing, by snapping a snap, ordinarily needed to use a purchased item. For example, and without limiting the generality of the foregoing, closing a snap for a collar on a shirt would preferably close a circuit.

Actively, where nothing occurs until the user actively triggers an event thereby activating the enabled entitlement. The user preferably opens a circuit, for example, and without limiting the generality of the foregoing, opening a container, by tearing open a box lid thereby disconnecting the circuit; removing pins from a packaged shirt, where one of the pins is part of the circuit; or requiring the user to scratch off a metal coating. An alternative preferred embodiment of active triggering of an event preferably requires a user to close a circuit, for example, and without limiting the generality of the foregoing, by snapping a snap, needed to use the purchased item. For example, and without limiting the generality of the foregoing, a snap on a garment, needed to secure the garment closed may be snapped closed when the user puts on the garment, thus actively closing the circuit, enabling the entitlement. In an alternative embodiment, the closing of the snap might not be ordinarily needed and would provide the user with deliberate control over activation of functionality.

Alternatively, and as shown in the example of the third pane of FIG. 15, actively bringing the purchased item comprising the entitlement very close to a sensor (not shown in FIGS. 15 and 16) would preferably activate the entitlement. Once the item has been brought very close to the sensor and the entitlement activated, the item may preferably be brought to the regular distance for wireless communication within whatever protocol is implemented, and cause the content associated with the now activated entitlement to play out.

Alternatively, sensors may preferably be used to activate the entitlement. For example, and without limiting the generality of the foregoing, light sensors may sense light when a box containing the entitlement is opened, thereby activating the entitlement. Other non-limiting examples would include temperature sensors which may preferably sense that a box containing the entitlement is being held, or that clothing comprising the sensor is being worn.

The playout device 1550 corresponds to the CDU 600 of the system of FIGS. 1 and 2. The embedded chip 1530 and 1535 corresponds to the AIM of the system of FIGS. 1 and 2. The cereal box 1520, bearing the embedded chip 1530 storing an entitlement corresponds to the mobile device 500, bearing the AIM. The playout device 1540 corresponds to the CDU 600 of the system of FIGS. 1 and 2.

FIGS. 15 and 16 show an example of a typical situation illustrative of the alternative preferred embodiment of the system of FIGS. 1 and 2. It is appreciated that all of the situations illustrated in FIGS. 15 and 16 are examples only and are not meant to limit the generality of the present invention. In FIGS. 15 and 16, the playout device 1550 is depicted as comprised in a household refrigerator. It is appreciated that the playout device may alternatively be comprised in other appropriate household devices and appliances. The playout device may also be compromised in non-household devices and appliances. For instance, and without limiting the generality of the foregoing, purchasing souvenirs in a museum or at a sporting event may activate a playout device.

It is appreciated that in the system of FIGS. 15 and 16 users may accumulate entitlements; trade entitlements between themselves; sell entitlements between themselves; and loan entitlements between themselves.

In some preferred embodiments of the system of FIGS. 15 and 16, the entitlement is preferably linked to the user's personal domain, the user's personal domain being defined as the user's home as well as other areas and appliances specific to the user. For example, and without limiting the generality of the foregoing, the user's personal domain may include the user's office, the user's automobile, and the user's MP3 player. Linking the entitlement to the user's personal domain is advantageous for entitlements to content of a personal or intimate nature. For example, and limiting the generality of the foregoing, a content item associated with an entitlement associated with underwear is preferably viewable only in the privacy of one's own domain.

The plurality of playout devices belonging to the user is preferably configured by the user to share a common domain identification name or number and a common domain encryption key. When the entitlement is transferred to one of the plurality of playout devices belonging to the user, the playout device preferably adds information to the entitlement, or encrypts the entitlement so that the entitlement may only be used within the user's personal domain. For example, and without limiting the generality of the foregoing, only devices sharing the common domain encryption key may decrypt the encrypted entitlement.

In some preferred embodiments of the systems of FIGS. 15 and 16, in order to prevent accidental playout of content items, the playout device for sale in a store is preferably not activated to play out content items. Upon purchase the playout device is preferably activated to play out content items. It is appreciated that the playout device for sale in a store may preferably be activated to play out content items associated with special demo entitlements.

In an alternative preferred embodiment, the embedded chip 1530 may preferably comprise an enhanced RFID. RFIDs, such as tags attached to clothing in order to protect against theft from stores, are inactivated when the user 1510 pays for an object associated with an attached RFID. An RFID system comprises a reader (or interrogator), an associated antenna and transponders that carry data. The reader transmits a low-power radio signal, through the antenna, that the tag receives via its own antenna to power an integrated circuit. Using energy generated when the signal enters the tag's radio field, the tag will briefly "converse" with the reader for verification and exchange of data. Once the data is received by the reader the data can preferably be sent to a controlling computer for processing and management.

Figure 17:
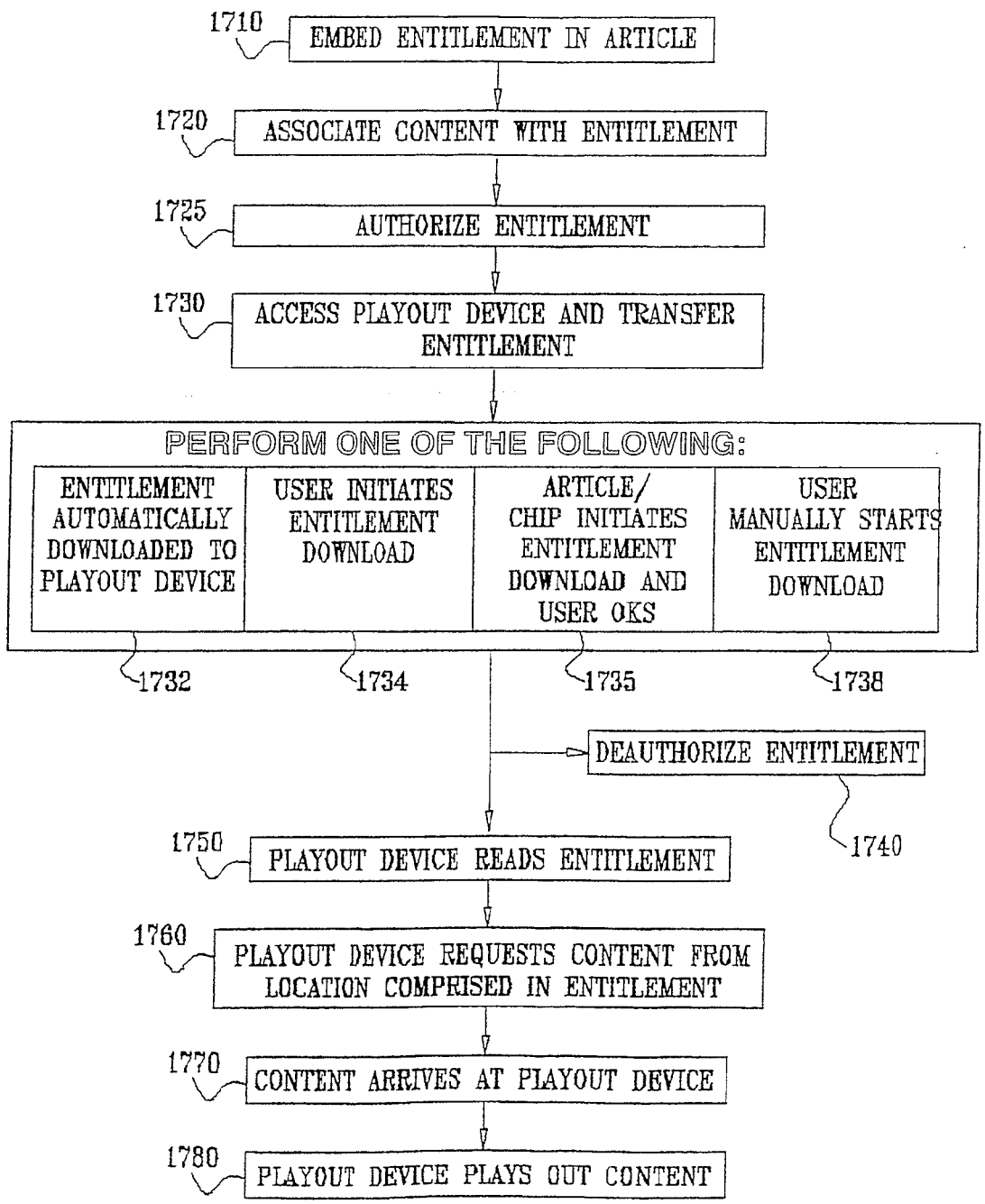
FIG. 17 is a generalized flowchart illustration of a preferred method of operation of the system of FIGS. 15 and 16.

Reference is now made to FIG. 17, which is a generalized flowchart illustration of a preferred method of operation of the system of FIGS. 15 and 16. A chip storing an entitlement is preferably embedded in a manufactured article (step 1710). The entitlement stored in the chip may or may not yet be enabled and/or activated as described above. Content 1630 is associated with the entitlement (step 1720) stored in the embedded chip 1530. It is appreciated the steps 1710 and 1720 may be performed in any order; the content may be associated with the entitlement either before or after the chip storing the entitlement is embedded in the article.

The entitlement is enabled and/or activated (step 1725). The term "authorize" (step 1725) used in FIG. 17 and the discussion thereof refers to enabling and/or activating the entitlement. It is appreciated that the entitlement may be authorized either before or after either of steps 1710 or 1720. The enabled and/or activated entitlement is transferred to the playout device 1550 (step 1730).

The entitlement is preferably transferred using one of the following transfer mechanisms:
   the entitlement is automatically downloaded to the playout device using an appropriate secure wireless protocol when the embedded chip is within communication proximity of the playout device (step 1732);
   the user, using the user interface of the playout device, initiates the download of the entitlement to the playout device using an appropriate secure wireless protocol (step 1734);
   the entitlement is automatically downloaded to the playout device using an appropriate secure wireless protocol when the embedded chip is within communication proximity of the playout device, but requires the user to authorize the download (step 1735); or
   the user 1510 uses the user interface of the playout device to manually initiate download to the playout device using an appropriate secure wireless protocol (step 1738).

Once the authorized entitlement is transferred to the playout device 1550, the entitlement in the manufactured article 1520 is disabled and/or deactivated (step 1740). The term "deauthorize" used in FIG. 17 and in the discussion thereof refers to disenabling and/or deactivating the entitlement. It is appreciated that in alternative preferred embodiments such as those described above with respect to the second pane of FIG. 16, that step 1740 might be deferred until a later, more appropriate time. For example, and without limiting the generality of the foregoing, when the entitlement is for a series, which may be viewed on any suitable playout device, it would not be appropriate to deauthorize the entitlement until after the last part of the series is transmitted to the playout device. Such an entitlement would be updated to indicate what episodes have been used. Alternatively, where the entitlement contains an expiration date, deauthorization need not occur; the entitlement will expire automatically once the expiration date has passed.

The playout device reads the entitlement (step 1750) and requests the content from the location comprised in the entitlement (step 1760).

The content arrives at the playout device (1770). The playout device then plays out the content (step 1780).

It is appreciated that the entitlement may preferably comprise a non-specific entitlement. For example, and without limiting the generality of the foregoing, the entitlement may entitle the user 1510 to view one or more non-specific episodes of a cartoon series rather than just one particular cartoon.

It is appreciated that various features of the invention which are, for clarity, described in the contexts of separate embodiments may also be provided in combination in a single embodiment Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:
1. A content item selection method comprising:
   receiving at an advertisement identification message (AIM) receiver in a content displaying unit (CDU) at least one AIM comprising content item display points associated with a display point category; and
   storing in an AIM storage unit of the CDU the content item display points comprised in the AIM in accordance with the display point category,
   thereby accumulating in the CDU in user accounts for a plurality of users content item display points for each of a plurality of display point categories, wherein users comprise mobile device users;

wherein the receiving comprises distinguishing between AIMs received from a mobile device which is registered and AIMs received from a mobile device which is not registered, the distinguishing being performed by the CDU, and wherein the content selecting further comprises prioritizing, by the CDU, from which mobile device user accounts to deduct AIMs according to previously loaded AIMs by the mobile device users, and the presence and absence, in the vicinity of the CDU, of registered mobile devices that had sent AIMs to the CDU and non-registered mobile devices that had sent AIMs to the CDU;

said content item selection method further comprising:

selecting a content item for display based, at least in part, on a comparison between a point total for one of the display point categories and a category associated with the content item, the selecting being performed by an advertisement selector comprised in the CDU; and displaying the selected content item on a display screen of the CDU.

2. Apparatus for content item selection, a content displaying unit (CDU), comprising:

a memory configured for:

receiving at least one AIM comprising content item display points associated with a display point category;

storing the content item display points comprised in the AIM in accordance with the display point category; and accumulating in the CDU in user accounts for a plurality of users content item display points for each of a plurality of display point categories, wherein users comprise mobile device users;

wherein the CDU is further configured for:

in the receiving step, distinguishing between AIMs received from a mobile device which is registered and AIMs received from a mobile device which is not registered, and said apparatus for content item selection further comprising:

a content item selection unit operative to choose a content item for display based, at least in part, on a comparison between a point total for one of the display point categories and a category associated with the content item, said content item selection unit in the CDU further operative to prioritize from which mobile device user accounts to deduct AIMs according to previously loaded AIMs by the mobile device users, and the presence and absence, in the vicinity of the CDU, of registered mobile devices that had sent AIMs to the CDU and non-registered mobile devices that had sent AIMs to the CDU.

3. Apparatus for content item selection comprising:

accumulation means for receiving at least one AIM comprising content item display points associated with a display point category;

storing the content item display points comprised in the AIM in accordance with the display point category; and accumulating in a content displaying unit (CDU), in user accounts for a plurality of users, content item display points for each of a plurality of display point categories, wherein users comprise mobile device users;

said apparatus for content item selection further comprising:

means for distinguishing between AIMs received from a mobile device which is registered and AIMs received from a mobile device which is not registered; and said apparatus for content item selection further comprising:

content item selection means for choosing a content item for display based, at least in part, on a comparison between a point total for one of the display point categories and a category associated with the content item, said content item selection means in the CDU further operative to prioritize from which mobile device user accounts to deduct AIMs according to previously loaded AIMs by the mobile device users, and the presence and absence, in the vicinity of the CDU, of registered mobile devices that had sent AIMs to the CDU and non-registered mobile devices that had sent AIMs to the CDU.

4. The method according to claim 1, wherein the advertisement selector makes the selection based on further preselected criteria.

* * * * *